United States Patent [19]

Koenig

[11] 4,349,956

[45] Sep. 21, 1982

[54] METHODS AND APPARATUS FOR FEEDING AND HANDLING ELECTRICAL PHASE INSULATORS FOR DYNAMOELECTRIC MACHINES

[75] Inventor: Fredrick Koenig, Fort Wayne, Ind.

[73] Assignee: General Electric Company, Fort Wayne, Ind.

[21] Appl. No.: 91,081

[22] Filed: Nov. 5, 1979

[51] Int. Cl.³ .............................................. H02K 15/10
[52] U.S. Cl. ......................................... 29/596; 29/734
[58] Field of Search ................. 29/596, 598, 734, 736; 310/42, 214, 215, 260, 270

[56] References Cited

U.S. PATENT DOCUMENTS

| | | | |
|---|---|---|---|
| 1,453,118 | 4/1923 | Apple . | |
| 3,439,205 | 4/1969 | Houtman | 310/180 |
| 3,857,171 | 12/1974 | Lund | 29/596 |
| 3,909,648 | 9/1975 | Clark | 310/260 |
| 4,090,290 | 5/1978 | Clark | 29/596 |
| 4,216,571 | 8/1980 | Miller et al. | 29/596 |

FOREIGN PATENT DOCUMENTS 1461126 1/1977 United Kingdom .

OTHER PUBLICATIONS

"Special Machines for the Production of Electric Motors", Statomat News Bulletin, 1.91.IV, 74.75; edited by Balzer & Droll.

Primary Examiner—Carl E. Hall
Attorney, Agent, or Firm—Ralph E. Krisher, Jr.

[57] ABSTRACT

Methods are disclosed of intermittently advancing a chain of insulators to a severing and transfer mechanism loading station while guiding end turn insulating portions along guide means while applying a frictional restraining force to the insulators. After the transfer mechanism is loaded with a leading insulator from the chain; the leading insulator is severed from the chain, the transfer mechanism is conditioned to receive the next leading insulator from the chain, and the loading and severing sequence is repeated. The loaded insulators are then wrapped about the transfer mechanism by spinning the mechanism and insulators and deflecting portions of the insulators projecting from the mechanism into close proximity to the mechanism. The wrapped insulators are then moved along the bore of a stator, released, unwrapped, and transferred to the stator. Apparatus disclosed herein includes material supply means, guide means, adjustable for differently sized insulators; insulator advancing and severing means; insulator transfer means, including an arbor and end insulator retainers; arbor spinning means; insulator wrapping means; arbor moving means; and arbor actuating means for positively transferring insulators from the arbor to a stator.

12 Claims, 35 Drawing Figures

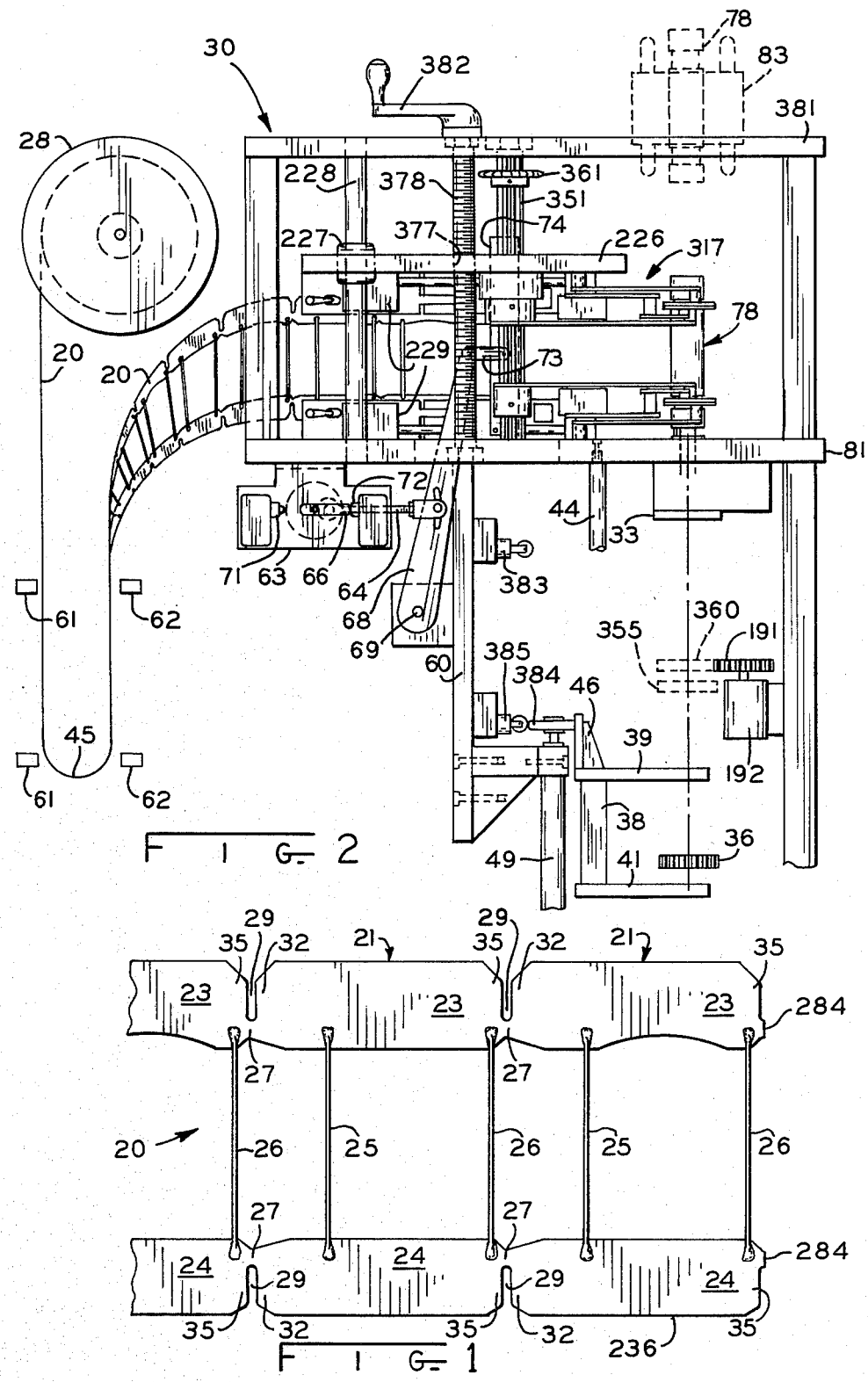

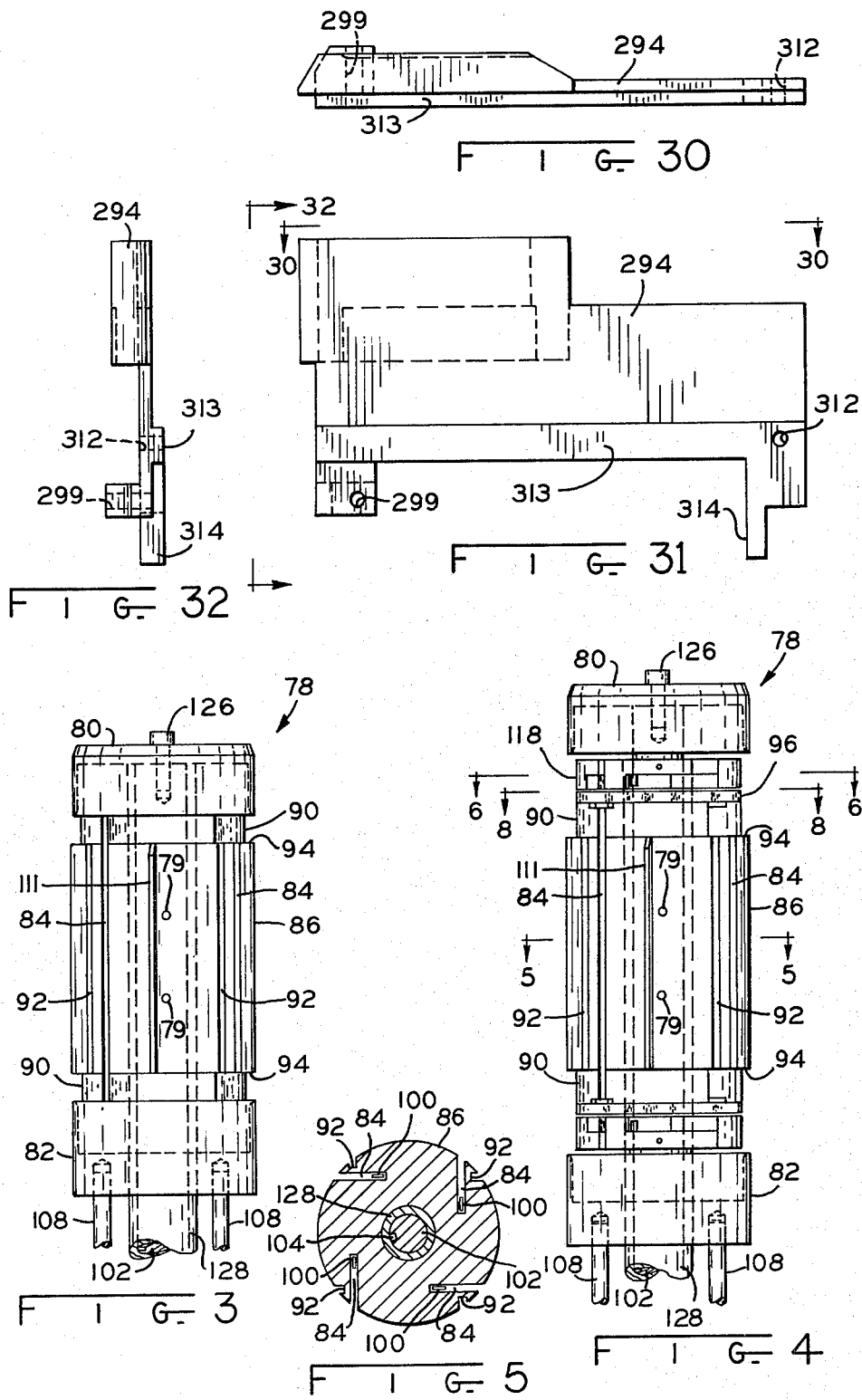

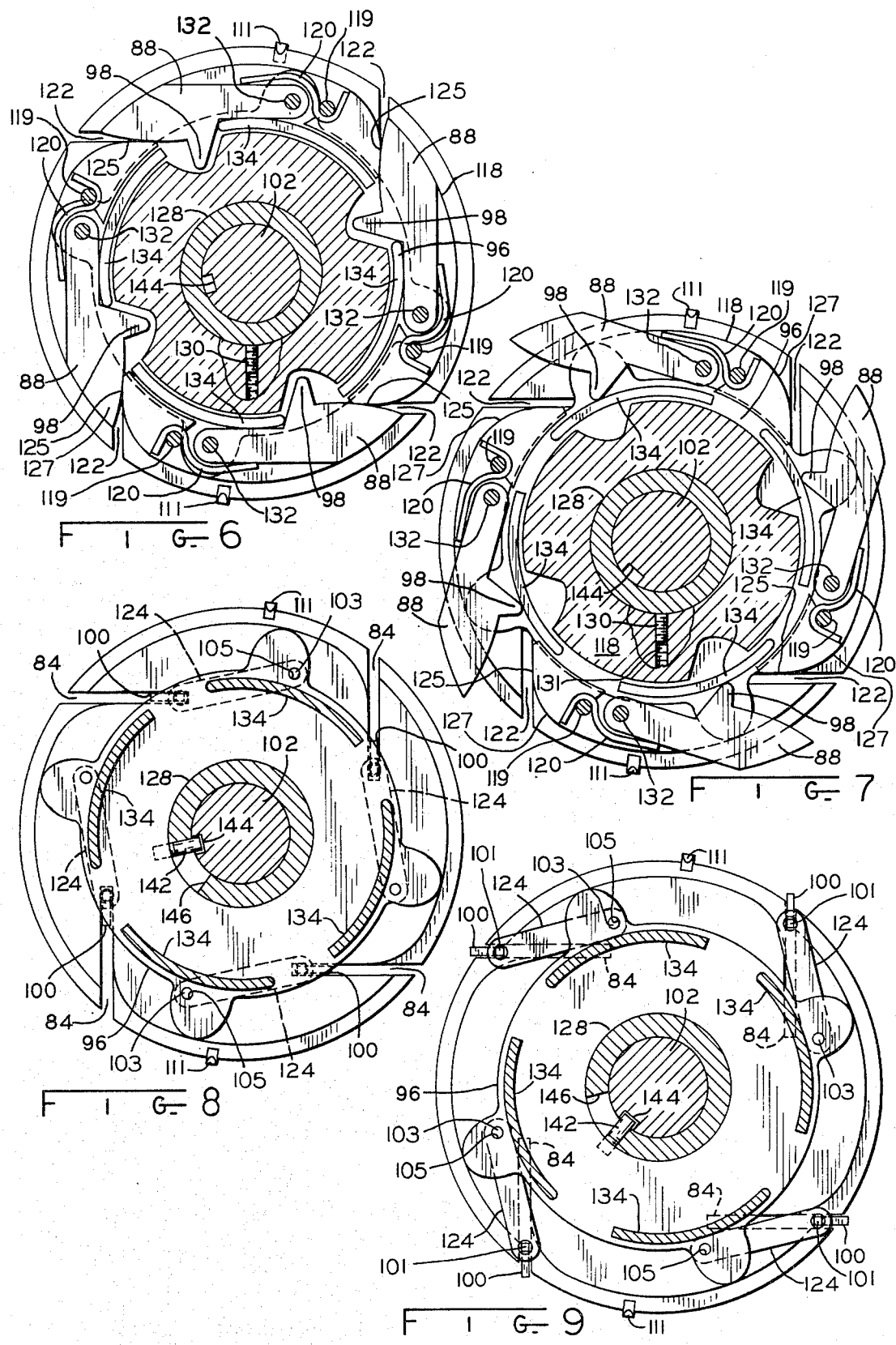

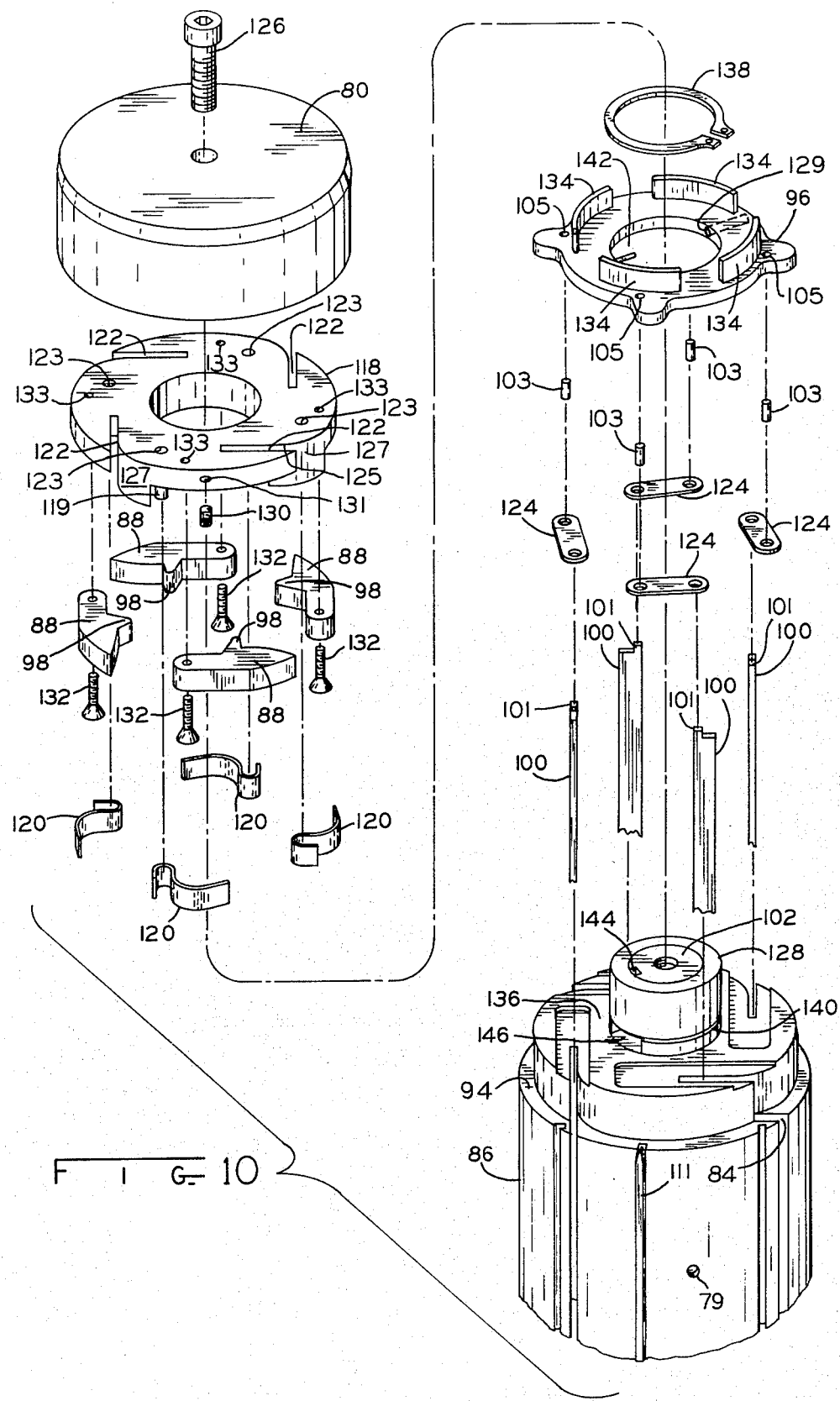

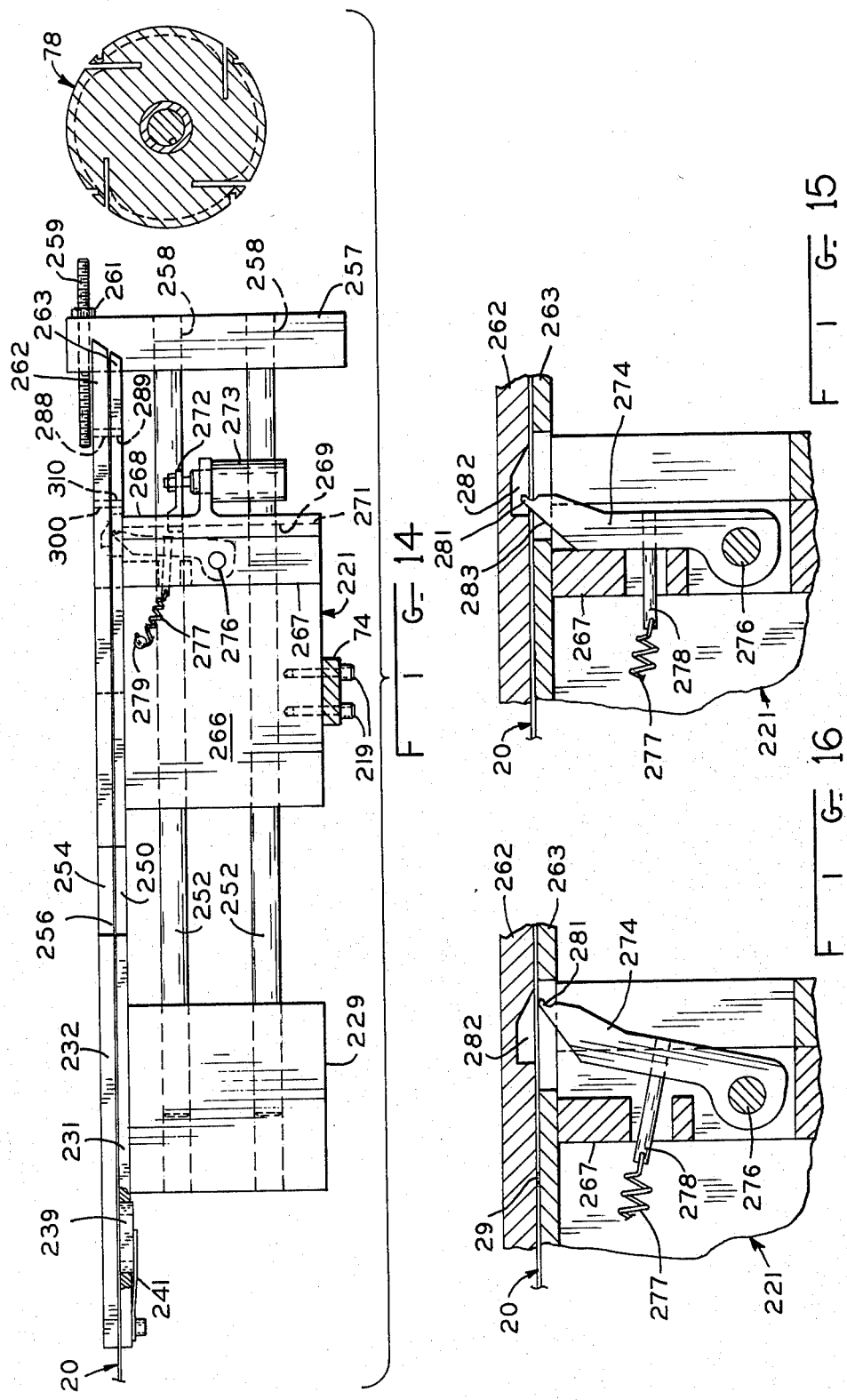

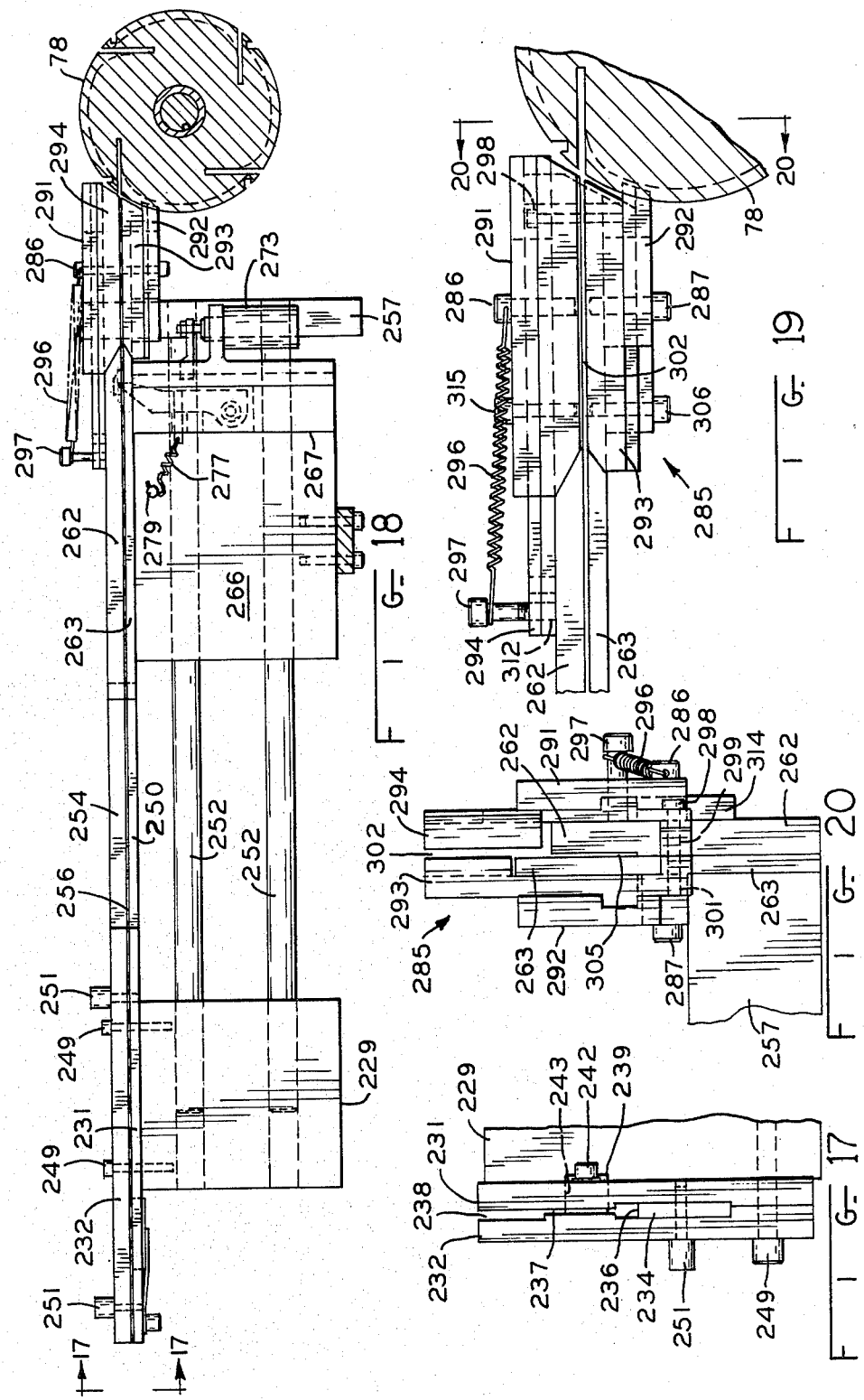

METHODS AND APPARATUS FOR FEEDING AND HANDLING ELECTRICAL PHASE INSULATORS FOR DYNAMOELECTRIC MACHINES

CROSS REFERENCE TO RELATED APPLICATIONS

This application contains subject matter related to subject matter contained in: copending Miller and Kindig application Ser. No. 918,055 which was filed June 22, 1978 now U.S. Pat. No. 4,216,571; copending Urick and Bienz application Ser. No. 27,370 which was filed Apr. 5, 1979 now U.S. Pat. No. 4,276,689; copending Burns application Ser. No. 008,603 which was filed Feb. 1, 1979 now U.S. Pat. No. 4,266,994; and copending Burns and Wesseldyk application Ser. No. 051,029 which was filed June 22, 1979 now abandoned. These related applications are all assigned to the assignee of this application and the entire disclosures of all of these related applications are hereby specifically incorporated by reference.

BACKGROUND OF THE INVENTION

The present invention relates generally to apparatus and methods associated with the handling and utilization of insulators for dynamoelectric machines that are known in the art as between winding phase insulators or, simply, "phase insulation" for dynamoelectric machines.

The above referenced Burns application, Ser. No. 008,603, shows and describes, among other things, apparatus and methods that are useful in connection with the manufacture of phase insulation or phase insulators. That application also describes in detail where, when, and how phase insulators are used in practice.

The above referenced Miller et al. application (Ser. No. 918,055) describes and shows, among other things, methods and apparatus having particular utility in connection with placing phase insulators on stator assemblies so that winding end turn insulating pieces are disposed adjacent to end turns of motor windings, and so that one or more connectors which interconnect the end turn insulators are disposed within axially extending slots of the stator core.

The above referenced Urick et al. application (Ser. No. 027,370) shows and describes, among other things, apparatus and methods whereby phase insulators may be automatically placed (i.e., machine placed) on stator assemblies.

The above referenced Burns et al. application (Ser. No. 051,029) describes and illustrates, inter alia, methods and apparatus for fabricating phase insulators which may be used to form a continuous chain of phase insulators. In general, McNeal U.S. Pat. No. 4,100,005 of July 11, 1978 (assigned to the assignee of this application); and Droll United Kingdom Pat. No. 1,461,126 of Jan. 13, 1977, also describe methods and apparatus whereby a continuous chain of phase insulators may be produced. In order to reduce the amount of text herein, the entire disclosures of the just mentioned McNeal and Droll Patents are specifically incorporated herein by reference.

The above identified copending applications are indicative, among other things, of work that is being done in the art, generally contemporaneously herewith, to permit the automatic placement or insertion of phase insulation in dynamoelectric machines.

However, the work and efforts of others as it is represented by the hereinabove referenced copending applications and issued patents has not addressed the problems associated with automatically feeding, handling, and loading individual phase insulators into tools or other devices that are utilized in conjunction with actually placing such phase insulators on stator cores. Moreoever, the prior work by others has not identified what problems would exist in connection with the mechanized handling, and mechanized placing of phase insulators on stator cores.

Accordingly, it will be understood that it would be desirable to devise methods for automatically handling phase insulators, and transferring phase insulators from a phase insulator supply to a stator core. Moreover, it would be desirable to identify problems associated with such handling and transferring, and to devise solutions for such problems; and to devise actual means for handling and transferring phase insulators.

Thus, it is a general object of the present invention to devise methods for handling and transferring phase insulators from a phase insulator supply to a means for placing phase insulators on a stator.

Another general object of the present invention is to provide apparatus having particular utility as a means for automatically handling phase insulators, and for placing such insulators on stators.

A more specific object of the present invention is to provide methods for feeding a plurality of insulators connected together in chain-like form to a work station or stations, separating individual insulators from the insulator chain, loading such insulators onto a transfer device, and thereafter transferring such insulators to a core.

Still another object of the present invention is to provide methods of confining phase insulators closely adjacent to a transfer device; whether such insulators have been loaded onto such device from an insulator chain or have been loaded from a supply of individual and discrete phase insulators.

Yet another object of the present invention is to provide methods of transferring insulators from an insulator holding device to a stator.

Still other objects of the present invention are to provide apparatus, mechanisms, and means, whereby each of the above stated, as well as other, method objects may be carried out.

SUMMARY OF THE INVENTION

In carrying out the above and other objects in one preferred form, I provide methods of intermittently advancing a chain of insulators to a severing and transfer mechanism loading station while guiding end turn insulating portions along suitable guide means and, preferably, while applying a frictional restraining force to the insulators. After the transfer mechanism is loaded with a leading insulator from the chain; I sever the leading insulator from the chain, condition the transfer mechanism to receive the next leading insulator from the chain (e.g., by indexing the transfer mechanism), and then advance the next leading insulator into the transfer mechanism and sever the insulator so advanced from the chain. After the advancing, severing, and mechanism conditioning sequence of steps have been performed a predetermined number of times; a preferred method includes wrapping the loaded insulators about the transfer mechanism (e.g., by spinning the mechanism and insulators, and deflecting portions of the insulators projecting from the mechanism into close proximity to the mechanism), retaining the loaded insulators in a wrapped configuration about the mechanism, and moving the wrapped insulators along the bore of a stator having windings for a first winding phase accommodated thereby. Thereupon, the wrapped insulators are released, unwrapped, and transferred from the transfer mechanism to the stator.

The advancing and severing procedures, mentioned above involving an insulator chain, preferably includes engaging trailing edges of insulators along gaps or notches, pushing part and pulling part of the chain in a first direction to overcome a frictional restraining force, severing a leading insulator from the chain, and sliding an advancing mechanism along the chain in a direction opposite to the first direction to a "home" position preparatory to advancing the next leading insulator.

Apparatus embodying aspects of the invention in preferred forms includes means for carrying out each of the process steps mentioned hereinabove. Apparatus specifically illustrated herein includes material supply means; guide means, adjustable for differently sized insulators; insulator advancing and severing means; insulator transfer means, including an arbor and end insulator retainers; arbor spinning means; insulator wrapping means; arbor moving means; and arbor actuating means for positively transferring insulators from the arbor to a stator.

The aforementioned and other objects, features, still other specific methods, and various advantages resulting from use of the present invention will become apparent from the following detailed description. The description itself may be more readily understood when considered in conjunction with the drawings accompanying this specification, and wherein like reference numerals have been utilized to denote like parts. However, it should be kept in mind that specific exemplifications described herein only represent preferred embodiments of the invention in various forms thereof that are disclosed herein for purposes of exemplification and not limitation.

BRIEF DESCRIPTION OF THE DRAWINGS

FIG. 1 is a view of a portion of a chain of phase insulators that may be utilized while practicing my invention in some forms thereof;

FIG. 2 is a front elevation, with parts removed and parts omitted, that embodies the invention in one form, and that may be used in the practice of the invention in another form;

FIG. 3 is a side elevation of part of the structure shown in FIG. 1;

FIG. 4 is a view of the same structure as shown in FIG. 3, but with parts thereof in different relative positions;

FIG. 5 is a view taken in the direction of lines 5—5 in FIG. 4;

FIG. 6 is a view taken in the direction of lines 6—6 in FIG. 4;

FIG. 7 is a view similar to FIG. 6, but with the parts there shown in different relative positions;

FIG. 8 is a view taken in the direction of lines 8—8 in FIG. 4;

FIG. 9 is a view similar to FIG. 8, but with parts there shown in different relative positions;

FIG. 10 is an exploded perspective of part of the structure shown in FIGS. 3 and 4;

FIG. 14 is a view, with parts removed or omitted for clarity, taken along the lines 14—14 of FIG. 13;

FIGS. 15 and 16 are views, to even larger scales, of fragments of the structure shown in FIG. 14;

FIG. 17 is a view, to enlarged scale, taken in the direction of lines 17—17 on FIG. 14;

FIG. 18 is a view similar to FIG. 14, but with different parts removed, and with other parts shown;

FIG. 19 is an enlarged view of part of the structure shown in FIG. 18;

FIG. 20 is a view taken in the direction of lines 20—20 in FIG. 19;

FIGS. 30–32 (appearing on the second drawing sheet) are detail views of still another one of the parts shown in FIGS. 19 and 20;

DESCRIPTION OF THE PREFERRED EMBODIMENTS

Figure 11:
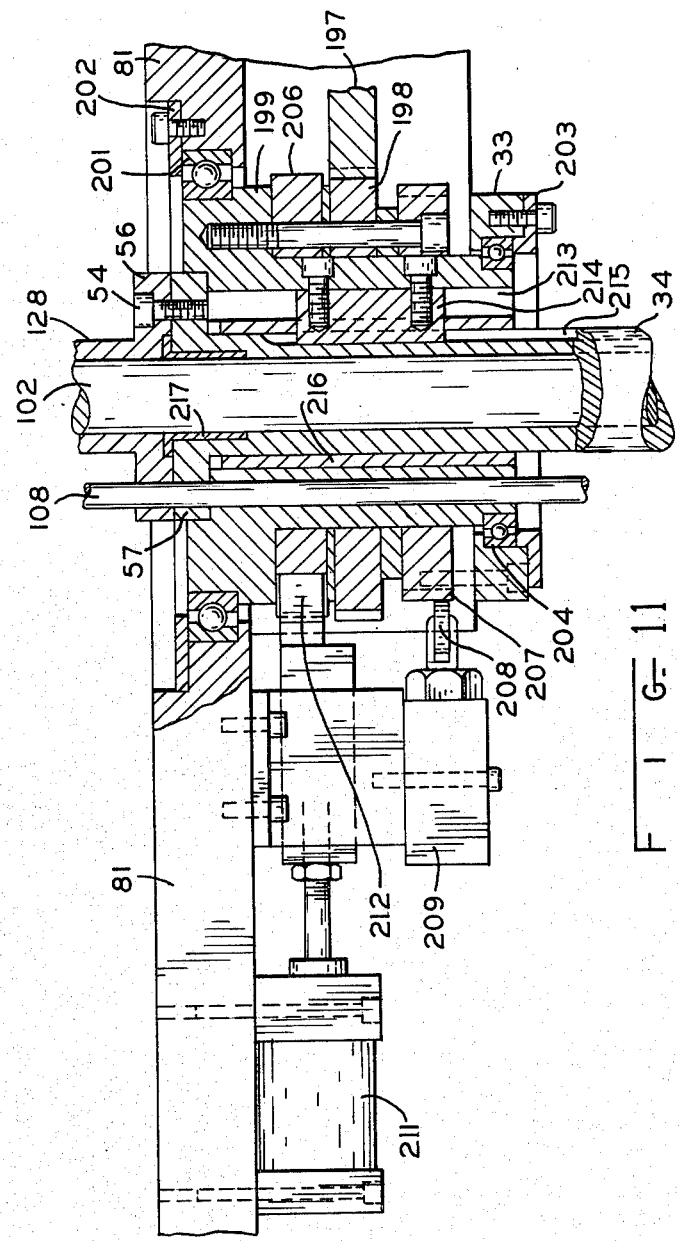
FIG. 11 is a fragmentary front elevation, drawn to an enlarged scale with parts shown in section, removed, and/or broken away), of part of the apparatus shown in FIG. 2.

With initial reference to FIG. 1, a chain 20 of a plurality of interconnected connectors 21 have been there shown. It will be appreciated that the chain 20 of connectors includes a plurality of separable individual connectors 21, each of which include flat end turn insulating portions 23, 24, and connectors or legs 25, 26. Adjacent ones of the insulators 21 are interconnected by webs 27 that extend between each of the adjacent end turn insulating portions 23, 24 of two adjacent insulators 21. It will be noted that each web 27 is proximate to a slot 29, the use of which is described in more detail hereinbelow.

As will be understood by persons of ordinary skill in the art, the chain 20 of between phase insulators is a product that may result from the practice of the invention disclosed and described in the above referenced Burns et al application, Ser. No. 051,029. However, one may also wish to use insulators produced by other equipment including, for example, that of the above referenced Droll British Patent.

It will be appreciated from a brief review of FIG. 2 that chain 20 of insulators is fed from a suitable supply such as a reel 28 into the apparatus 30. Since the chain 20 is advanced intermittently in the apparatus 30, a loop 45 of material is maintained between the reel 28 and apparatus 30. This loop is maintained by the action of photocell pairs 61, 62, the signals from which may be used to alternately energize and de-energize the drive motor for reel 28; or to cause such drive motor to alternately drive reel 28 at high and low speeds so as to maintain the feed loop 45. Within the apparatus 30, the chain 20 of insulators is intermittently advanced to a phase insulator inserting mechanism 78 and individual insulators are subsequently inserted into a stator core 83 as more fully described hereinbelow, and also as described in the above referenced copending application of Miller et al., Ser. No. 918,055.

Still having general reference to FIG. 2, after individual insulators 21 are placed in the inserting device or mechanism 78, the mechanism 78 is elevated from the solid line position thereof shown in FIG. 2 to an operative transfer position (shown in phantom), whereupon insulators are transferred from the device 78 into the stator core 83.

Within the apparatus 30, the chain of insulators is intermittently advanced, a leading end of a first insulator 21 is transferred into the device 78 and the trailing end of the first insulator (which projects from device 78) is severed from the chain along the webs 27. Thereupon, the device 78 is indexed to receive the leading end of a second insulator, the above described general sequence is repeated, and this process continues until the device 78 is loaded with the leading ends of a predetermined desired number of phase insulators. Thereupon, the trailing end portions of the insulators projecting from the device 78 are wrapped around the device 78 and retained thereon. A more detailed description of the advancing, guiding, severing, and wrapping aspects of the apparatus 29 and preferred methods of handling, advancing, and wrapping insulators is presented hereinbelow.

With reference now to FIGS. 3–10 the inserting mechanism or device 78 will be described in detail, it being noted that a substantially similar description thereof is contained in the above referenced Miller et al. application Ser. No. 918,055. At the outset, it is noted that various ones of the views 3–10 have parts removed or broken away in the interest of clarity. However, sufficient detail regarding the mechanism 78 is disclosed herein to understand how the mechanism 78 is made and how it operates, With this in mind, it should now be noted that the top and bottom portions of the device 78 include a number of identical parts which are mounted in "mirror image" relationship at the top and bottom of a main arbor or cage 86 of the device 78.

With joint reference to FIGS. 1–4, phase insulators 21 are loaded onto the inserting device or mechanism 78 while two end or retaining caps 80 and 82 (see FIGS. 3 and 4) are in an extended or "open" position as best illustrated, for example, in FIG. 4.

The leading ends 35 of four of the phase insulators 21 (including leading end connectors 26—see FIG. 1) are disposed at predetermined locations within a leading end accommodating means illustrated as four longitudinally extending slots or grooves 84 (see FIG. 5) within the substantially cylindrical arbor 86. The insulators are so placed one at a time, and the mechanism 78 is indexed after each insulator is placed thereon so as to align a different leading end accommodating means for receipt of each subsequent insulator. The leading ends of the insulators are retained in the predetermined locations or grooves by spring loaded means that have been illustrated herein as retaining arms 88 (see FIG. 6). While the insulators are being loaded onto the arbor, the arms 88 are in the relative positions shown in FIG. 6, and the leading ends 35 of the insulation pieces 23, 24 (see FIG. 1) are forceably slid between the arms 88 and surfaces 125 (see FIG. 6). After four insulators have been placed on the mechanism 78, the trailing end portions of the insulators are deformed arcuately about deforming or peripheral surfaces 90 (see FIGS. 3 and 4) of the arbor 86, and the trailing end connectors 25 of the phase insulators (see FIG. 1) are positioned at other predetermined locations on the device by moving the trailing end connectors 25 into trailing end accommodating means that are illustrated herein as four longitudinally extending slots or grooves 92 (see FIG. 5).

The end turn insulating portions 23, 24 (see FIG. 2) are retained adjacent to the deforming surfaces 90 of the arbor and are thereby prevented from moving radially outwardly. The means by which the insulating portions 23, 24 are automatically deformed against the deforming surfaces (i.e., wrapped therearound) involves spinning the arbor and deflecting the portions 23, 24; and this operation is described in detail hereinbelow with specific reference to FIGS. 33–35. For the present it is only noted that once the end turn insulating portions 23, 24 have been deformed (while the caps 80, 82 are "open" as shown in FIG. 4), such portions 23, 24 are prevented from moving radially outwardly away from the deforming surfaces 90 by retracting or closing the retaining caps 80, 82 to the relative positions thereof (with respect to arbor 86) that are shown in FIG. 3. Thus, the end turn insulating portions of the phase insulators are trapped or retained adjacent to the deforming surfaces 90 by the end caps 80, 82 when the parts of the device 78 are in the relative positions thereof as illustrated in FIG. 3. Longitudinal displacement of the phase insulators relative to the arbor 86 is also prevented by abutment surfaces 94 that are best shown in FIGS. 3 and 4, and FIG. 10.

After phase insulators have been loaded onto arbor 86 and retained thereon by the caps 80, 82; the mechanism 78 is preferably moved upwardly through the bore of a stator core to the phantom line position thereof shown in FIG. 2. Thereupon, the end caps 80, 82 are opened and the insulators are transferred to the core 83 from the transfer mechanism 78.

The end portions 23, 24 of the insulators 21 adjacent the deforming surfaces 90 of the arbor 86 are released when the retaining caps 80 and 82 are moved to the open positions thereof as best illustrated in FIG. 4. Upon such release, the connectors 25 of the trailing ends 32 of the phase insulators 21 (see FIG. 1) are moved outwardly from the grooves 92 of the arbor 86 and into predetermined slots of the core. In actual practice, the end insulators 23, 24 are formed of relatively "springy" material such as polyethylene terephalate; and upon release by caps 80, 82 the pieces 23, 24 may tend to spring away from the arbor and into slots of the stator.

The leading ends 35 of the insulators (see FIG. 1) are then ejected outwardly from the respective slot or groove 84 in which they were initially disposed by rotating a cam 96 (details of which are apparent in FIG. 10), under the influence of shaft 102, from the position of cam 96 shown in FIGS. 6 and 8 to the position of cam 96 shown in FIGS. 7 and 9. Rotation of the cam 96 moves the retaining arms 88 and causes surfaces 95 of each of the arms 88 to engage and push the end turn insulating portions 23, 24 of the insulators, in the regions of grooves 92, away from the arbor. Rotation of the cam 96 also moves connecting arms 124 (see FIGS. 10 and 9) and thereby causes an ejecting means illustrated as blades 100 to engage and push the leading end connectors 26 of the insulators 21 outwardly from the grooves 84 and into other predetermined slots of the stator core. Thus, the phase insulators will be disposed on a stator core in a pin wheel configuration as illustrated and described in the above referenced copending Miller et al. application Ser. No. 918,055. Thereafter, auxiliary windings may be placed on the stator core utilizing conventional techniques, all of which is also described in the copending Miller et al. application.

As will be understood, the locations of the connectors 26, 25 of the phase insulators 21 may be varied from the locations illustrated in FIG. 1. For example, if the connectors 25, 26 were mutually spaced further apart, the phase insulators could be loaded onto the mechanism 78 of FIGS. 2-10 by utilizing only the four grooves 84 on the arbor 86 and thus eliminate the need for the other four grooves 92.

With reference to FIGS. 3-5, the inserting mechanism 78 includes the arbor or cage 86 which is fixedly mounted to a tube or sleeve 128. Any suitable means may be used to accomplish the fastening of arbor 86 to this sleeve or tube 128, but preferably a plurality of drilled and tapped holes 79 are provided around the circumference of the arbor 86, and set screws are threaded into the holes 79 and into the central bore extending through the arbor 86 so as to grip the outer diameter of the tube 128 which extends along such bore. Such set screws insure that neither axial nor rotary movement will take place between the arbor 86 and tube 128. As will be pointed out in more detail hereinbelow with reference to FIGS. 11 and 12, the tube 128 extends downwardly as viewed in FIG. 2, through a mounting structure fastened to the lower frame member 81; and various mechanisms described hereinbelow are operative for raising and lowering the device 78 from an insulator loading station (the position of device 78 as shown in solid lines in FIG. 2) to an elevated insulator transferring station (represented with phantom lines in FIG. 2) where insulators are transferred automatically onto a stator core.

As previously stated, two substantially identical retaining caps 80, 82 are disposed at opposite ends of the arbor 86 as best revealed in FIGS. 3 and 4. The retaining caps 80, 82 are moveable relative to each other and relative to the arbor 86 as clearly revealed in FIG. 4. The cap 80 is fixedly attached to a shaft 102 which is longitudinally slideable and rotatable within tube 128 and thus also movable relative to the arbor 86. The shaft 102 is similarly slideable and rotatable relative to the bottom end cap 82 and three rods 108 which are revealed in FIGS. 3, 4, and 2. The rods 108 support and control the position of lower cap 82, and the rods 108 are axially moveable relative to the shaft 102, tube 128, and arbor 86. These rods 108 interconnect the lower retaining cap 82 with a driving structure which is described in more detail hereinbelow with reference to FIGS. 11 and 12.

With reference to FIGS. 2-4, the entire device 78 is initially positioned at an insulator loading station at which time the retaining caps 80, 82 are open (as shown in FIG. 4). Then, after insulators have been fully loaded onto the device 78 by following an insulator loading and arbor indexing sequence; and after the trailing ends of the insulators have been wrapped about the arbor as described hereinbelow with specific reference to FIGS. 2 and 33-35; the rods 108 move upwardly relative to arbor 86 to close the lower cap 82, and the shaft 102 moves downwardly relative to arbor 86 to close the upper cap 80, so that the relative positions of caps 80, 82 and arbor 86 will thereafter be as shown in FIG. 3.

Subsequently, the entire mechanism 78 moves from the insulator loading station to the insulator transferring station. Then, with the mechanism 78 and a stator core in insulator transferring relationship; the rods 108 and shaft 102 are once again moved axially with respect to the tube 128 and arbor 86 in order to open the retaining caps 80, 82 and release the trailing ends 32 of the insulators 21 carried on the arbor 86. Thereupon, the shaft 102 rotates a limited amount relative to the arbor 86 (as well as relative to the lower cap 82, rods 108, and tube 128) to actuate the camming mechanisms at the top and bottom of the arbor 86, and to thereby effect the transfer of insulators from the arbor 86 to a stator core.

It will be noted, with reference to FIGS. 6, 7, and 10, that the arbor 86 is provided with keys 111 that slide along slot openings of the stator core to insure proper alignment of both the arbor and the slotted stator core as they are being moved into insulator transferring relationship.

FIGS. 6-10 illustrate details of portions of the camming mechanisms referred to hereinabove and which provide a means for retaining the leading ends 35 of phase insulators within the grooves 84 of the arbor 86 (see FIGS. 6, 7 in particular), and for ejecting the leading ends of the phase insulators, including the leading end connectors 26, out of their respective grooves and into predetermined slots of the stator core.

The camming means includes cams 96 (one at the top of arbor 86 and one at the bottom thereof) which have cam shoulders 134 that co-act with movable arms 88 (see FIGS. 10, 6, and 7). The arms 88 are disposed about the periphery of a slotted plate 118 (see FIG. 10), and are carried by screws 132 that are threaded into holes 133 in the plate 118. A spring 120 retained by a pin 119 pressed into a hole 123, is provided for each retaining arm 88, and these springs urge the retaining arm 88 to the relative positions shown in FIG. 6. In the FIG. 6 position, the arms 88 will press against and thereby retain the leading ends of phase insulators after they have been inserted into the grooves 122 of the plate 118 by pinching the insulator pieces 23, 24 against the surfaces 125 of lobes 127 that form part of the unitary structure of plate 118. The cam 96, rotatably movable with the shaft 102 (but not axially movable therewith), rotates with shaft 102 and engages and pivots the retaining arms 88 against the bias of springs 120 in order to release the phase insulator portions that are held thereby. This action also substantially simultaneously causes an ejecting surface 95 of each of the arms 88 (see FIGS. 6 and 7) to engage and move the end portions of the phase insulators outwardly away from the arbor 86.

FIGS. 8, 9 and 10 better illustrate a means for ejecting the connectors of the phase insulators outwardly from the grooves 84 of the arbor and into the predetermined slots of the core. As illustrated, this means constitutes blades 100 slideably received within each of the grooves 84. The blades 100 are attached to the cam 96 by way of connecting arms 124. Rotary movement of the cam 96 causes the blades 100 to move outwardly along and out of the grooves 84, and thus push the connectors 26 of the phase insulators out of the grooves of the arbor and into stator core slots.

FIG. 10 illustrates, in detail, the parts previously described. The retaining cap 80 and its associated camming mechanism are clearly revealed. As stated previously, the lower cap 82 (see FIG. 3) is interfitted with a camming mechanism identical to the camming mechanism illustrated in FIG. 10. Moreover, the fingers 88, springs 120, etc. as well as linkages 124 and cam 96 (best seen in FIG. 10) are duplicated at the bottom end of the arbor.

Caps 80 and 82 differ only in that the upper cap 80 is fastened to the shaft 102 and carried for movement therewith by a retaining screw 126; whereas (see FIGS. 3, 4) the lower retaining cap 82 has the control rods 108 threaded thereinto for control purposes. Also, a centrally located hole of sufficient size is provided in lower cap 82 to permit relative axial movement of cap 82 with respect to the tube 128.

With reference once again to FIG. 10, when the parts thereof are initially assembled; the blades 100 are disposed within the slots 84 of the arbor 86, and connecting arms or links 124 are positioned on the blades. Holes in the connecting links 124 receive and trap projections 101 at the upper and lower ends of the blades 100. Subsequently, the cam 96 is assembled onto the extension of the tube 128 that is shown in FIG. 10; and another identical cam 96 is assembled onto the tube 128 at the bottom of arbor 86 (see FIG. 4).

When the cams 96 are assembled with the arbor 86 and tube 128, the screws 142 will not yet project into the bore of the cams 96 as suggested by FIG. 10. thus, the cams 96 will readily slide along the tube 128. At this time, the shaft 102 will not have been assembled with the tube 128 so access can be had to slots 146 formed in the tube 128 (adjacent the upper and lower end faces of the arbor) from the bore of the tube 128 in order to thread screws 142 so that they will project the bore of tube 128 through the slots 146. However, it would be found to be more convenient to provide holes in tube 128 diametrically opposite the slots 146, and oversize holes 134 in cams 96 opposite the tapped holes for screws 142; and to insert and tighten the screws 142 through such holes, with an allen wrench.

Prior to assembling the cams 96 as just described, the blades 100 are positioned in slots 84 as previously mentioned, and links 124 are positioned so that holes therein trap the projections 101 of the blades 100. Then the cams 96 are positioned against the end faces of the arbor 86 with pins 103 (carried by a press fit in holes 105) aligned to project into and trap the ends of the links 124 (opposite the end of such links which trap the projections 101 on the blades 100).

At the time that cams 96 are assembled with the pieces as described hereinabove, the threaded hole in each cam 96 which accomodates a screw 142 is aligned with a slot 146 formed in the tube 128; and retaining snap rings 138 are snapped into place in grooves 140 machined into tube 128. Thus the cams 96 are trapped between the snap rings and the end faces of the arbor 86. Thereupon, the screws 142 are threaded into the tapped holes in cams 96 as previously described.

After the cams 96 are assembled with the arbor 86, the assemblies comprising slotted plates 118, retaining arms 88, screws 132, springs 120, etc. are assembled together and positioned along the tube 128; and set screws 130 are threaded into the plates 118 and into engagement with the tube 128 so as to lock plates 118 to tube 128. Thus, the cams 96 and the plates 118 are locked with the tube 128 so that relative axial movement therebetween cannot take place, and so that relative rotary movement only between cams 96 and the balance of the sub-assembly so far described is permitted. Thereafter, the lower cap 82 is positioned along tube 128, and then the shaft 102 is positioned along the bore of tube 128. Preferably, tube 128 is slid along the shaft 102, with care being exercised to insure that the slot or keyway 144 in shaft 102 is aligned to accommodate the screws 142 that by now project into the bore of tube 128.

Thereafter, the cap 80 is positioned over the upper plate 118 and its associated parts, and a screw 126 is threaded downwardly into the threaded centrally located hole in the end of shaft 102. When this has been accomplished, the upper cap is free to undergo rotary motion with the shaft 102 and also axial motion in response to axial movement of shaft 102 relative to the tube 128. However, the upper and lower plates 118 are constrained against any movement relative to tube 128 because of set screws 130, and the cams 96 are prevented from moving axially relative to tube 128 because of abutment surfaces established by the end faces of arbor 86 and the snap rings 138. On the other hand, the cams 96 are free to undergo limited rotary motion due to rotary movement of the shaft 102. This relative movement takes place because the side walls of the slot 144 along shaft 102 bear against and drivingly engage the projecting ends of the screws 142 attached to the cam plates 96. However, such rotary movement is limited and stopped when the screws 142 come to the ends of the slots 146 formed in the tube 128. It thus should now be understood that rotary movement of shaft 102 will cause cam 96 to rotate and thereby actuate the arms 88 between open and closed positions thereof as previously described. However, axial movement of shaft 102 does not cause corresponding axial movement of the cams 96 because the screws 142 merely slide (relatively speaking) along slot 144 during axial movement of the shaft.

It also should now be understood that axial movement of the shaft 102 upwardly and downwardly is operative to open and close the upper cap 80; and that the slot 144 in shaft 102 is made sufficiently long that the lower screw 142 will not interfere with the desired axial movement of shaft 102.

The lower retaining cap 82 has a centrally disposed bore therein sufficiently large to slidably receive the sleeve 128 therethrough, and the relative axial position of the lower cap 82 with respect to the arbor 86 is determined by control rods 108 which are threaded thereinto, all as previously mentioned. Thus, while the "open" or "closed" condition of upper cap 80 is determined by the axial position of shaft 102 relative to arbor 96; the lower cap 82 is moved between open and closed positions by moving the control rods 108 axially with respect to tube 128 and arbor 86.

The means by which the inserting mechanism 78 is actuated and moved will now be described with specific attention being directed to FIGS. 2, 11, 12, 3 and 4. Initially, and with referene to FIG. 2, it will be noted that the mechanism 78 is movable with respect to the bottom frame member 81 of the apparatus 30 from the solid line position thereof to the elevated position illustrated in phantom in FIG. 2. It will be noted that FIGS. 3 and 4 show the rods 108, shaft 102, and sleeve or tube 128 broken away. However, it will be understood with joint reference to FIGS. 3 and 2 that the rods 108, tube 128 and shaft 102 extend downwardly to (and, except for tube 128, through) the lower frame member 81. Adjacent to the lower frame member is an appropriate suspension and driving means, now to be discussed in more detail with reference being confined to FIGS. 11 and 12.

From FIGS. 11 and 12 it will be seen that the control rods 108 (two of which are not viewable in the section taken for FIG. 11), shaft 102, and tube 128 are coupled with driving and control mechanisms which are located below the frame member 81. Also shown in FIG. 11 is a first driving and control mechanism 33 which has the housing thereof omitted from FIG. 11 for purposes of clarity. Extending downwardly from the drive and control mechanism 33 are the shaft 102, control rods 108, and a tube 34. These elements (shaft 102, tube 34, rods 108) extend well below the lower frame member 81 and the lower ends of these elements, along with driving and control means associated therewith, are shown in FIG. 12.

Figure 12:
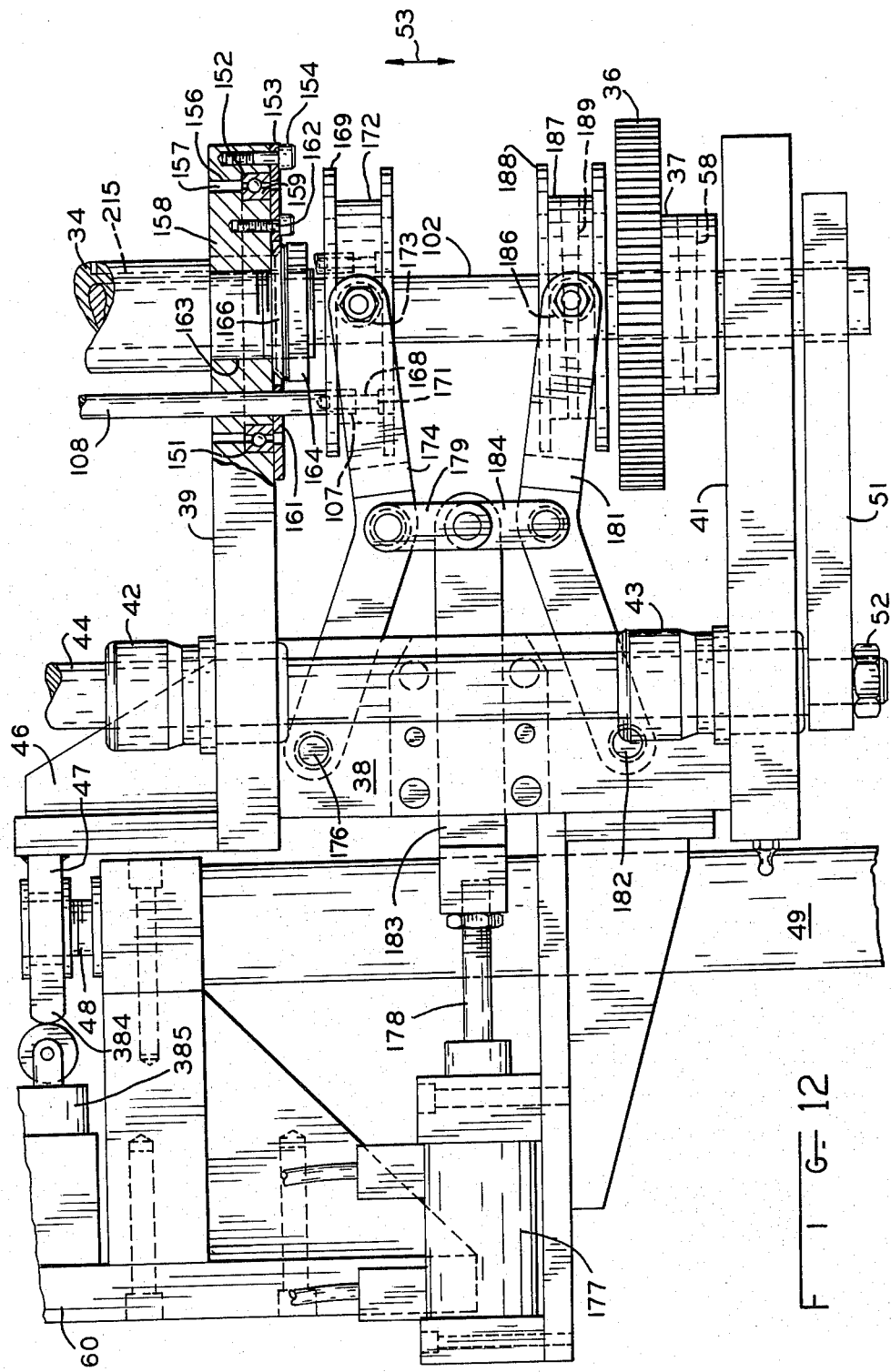
FIG. 12 is a fragmentary view, drawn to an enlarged scale (with parts shown in section, removed, and/or broken away), of another part of the apparatus shown in FIG. 2.

For purposes of orientation, it will be noted that the structure shown in FIG. 12 includes a gear 36 that is fixedly attached to the shaft 102 near the bottom end thereof by means of a tapered pin driven into tapered holes in a collar 37 (which is a unitary part of gear 36). This same gear 36 is also shown in the lower portion of FIG. 2 in full lines and in two phantom positions 355, 360 in FIG. 2. This provides a perspective of the different relative positions of the gear 36 and corresponding parts of its associated structure during different times in an operational cycle of the apparatus 30.

The entire structure illustrated in FIG. 12 is carried by a movable main frame member 38 which is welded to upper and lower sub-frame members 39, 41. The members 39 and 41 each carry bushings 42, 43 which are slidable along a vertically extending guide rod. The rod 44 in turn is suspended from the lower main frame member 81 (see FIG. 2 and compare with FIG. 12). A nut 52 on the bottom of rod 44 holds a stabiliozer plate 51 fixed thereto, and the plate 51 accommodates and ensures alignment of other not shown guide rods similar to rod 44. It will also be seen from FIG. 12 that the upper sub-frame member 39 is interconnected through a plate 46 and yoke 47 with the rod 48 of a main cylinder 49; the main cylinder 49 in turn being fastened to a vertical member 60 of the main frame of the apparatus 30.

At appropriate times, and as discussed in more detail hereinbelow, the cylinder 49 is actuated to selectively cause extension and retraction of the rod 48 whereupon all of the structure supported by the movable main frame member is moved upwardly and or downwardly as indicated by arrow 53 along the guide rod 44. Thus, it should now be appreciated that the main cylinder 49 is operative to raise and lower the guide rod 108, shaft 102 and tube 34 shown in FIG. 12; and thus to move the arbor 86 between the insulator loading and insulator transferring stations.

It also should be noted from FIG. 12 that the tube 34 is rotatably supported and retained on sub-frame member 39 by means of a ball bearing 151. The outer race of the bearing 151 is trapped against a counterbored surface 152, and retained thereagainst by a retainer 153 that is fastened to the frame member 39 by means of screws 154. The counterbored surface 152 of the member 39 is adjacent to the bore 156 of a hole 157 through the member 39; and the rods 108 and tube 34 project through such hole 157. The actual support for tube 34 is provided by a tube support disk 158 which rests on the inner race 159 of bearing 152. A retainer 161 bears against the bottom of the inner race 159, and this retainer is fastened by means of screws 162 to the disk 158. Thus, the inner race 159 of the bearing 152 is sandwiched and clamped between the disc 158 and retainer 161.

The disc 158 and retainer 161 are generally solid members that each have three clearance holes therein along which the three rods 108 are free to slide. In addition, a centrally located hole is provided in the disc 158 and retainer 161 in which a turned down (i.e., reduced diameter) and threaded portion 163 of tube 34 is received. The unturned portion of tube 34 is larger than the hole in disk 158, and thus tube 34 bears against the upper surface of the disk. The lower end of tube 34, as is apparent from FIG. 12, is locked against the underside of retainer 161 by means of a lockwasher 166 and a locknut 164.

With reference now to FIG. 11, it will be understood that the guide rods 108 and shaft 102 move up and down through the main frame member 81 under the control of the main cylinder 49 described hereinabove. In addition, the tube 128 moves upwardly and downwardly under the influence of the main cylinder 49 (described in conjunction with FIG. 12) since the tube 128 is interconnected with tube 34 by means of bolts 54 which fasten together flanges 56, 57, which in turn define the extremities of the tubes 128, 34 respectively.

Referring once again now to FIG. 12, the mechanism by which the controlled movement of rods 108, tubes 34 and shaft 102 is accomplished will be described. It will be noted that the ends 107 of rods 108 are retained in counterbored holes 168 of a spindle 169 by means of screws 171. The spindle 169 is free to both rotatably and slidably move on the shaft 102, with the rotational position of a spindle 169 relative to the frame member 39 being determined by the relative angular location of the rods 108, it being recalled that the angular orientation of the rods 108 is constrained to coincide with that of the tubes 128 and 34 because of the structural interrelationships shown in FIG. 11.

It will be seen from FIG. 12 that the flange bounded track 172 of spindle 169 receives a roller 173 which is carried by a toggle linkage arm 174. At appropriate times during a machine cycle, the arm 174 will pivot downwardly about its pivot pin 176 in response to actuation of cylinder 177 to cause retraction of cylinder rod 178 to the left as viewed in FIG. 12. Thus, when rod 178 retracts, it moves an end of link 179 attached thereto to the left and this movement causes a downward pivoting movement of the arm 174. The downward pivoting movement of the arm 174 in turn will cause spindle 169 to move downwardly as viewed in FIG. 12 and cause a corresponding downward movement of rods 108 relative to the tube 34. This in turn causes downward movement of the lower retaining cap relative to the arbor all as discussed hereinabove.

At the same time that arm 174 is moving downwardly, a toggle arm 181 will be caused to move upwardly from its position shown in FIG. 12 as it pivots about its pivot pin 182. This movement of arm 181 is caused by the interconnection between the arm and the drive link 183 (which is fastened to the end of rod 178) through a link 184. Upward movement of arm 181 (i.e., upward pivoting movement about pin 182) will carry a roller 186 attached at an end thereof upwardly as viewed in FIG. 12. Since the roller 186 is trapped in the track 187 of a lower spindle 188, the spindle 188 will be forced to move upwardly. It will be observed that the spindle 188 is pinned, by means of tapered pin 189, to shaft 102. Thus, actuation of cylinder 187 will, by means of the toggle linkage just described, control the upward and downward movement (and thus position) of shaft 102. Moreover, shaft 102 and spindle 188 attached thereto will be free to rotate relative to the toggle arm 181 and roller 186 about the longitudinally extending axis of shaft 102 and as determined by driving forces applied to gear 36.

It now should be understood from a comparison of FIGS. 2 and 12 that at appropriate times during a cycle of machine operation, the cylinder 49 will extend in order to raise the frame members shown in FIG. 12 to an elevated position such that the gear 36 is moved to the dotted line position thereof denoted by the reference numeral 355 in FIG. 2. Thereupon, the cylinder 177 (see FIG. 12) is retracted in order to pivot the toggle arms 174, 181 towards one another and thus move the spindles 169, 188 towards one another. I have found that three quarters of an inch (19 mm) of movement by each of the spindles under the control of the toggle linkage is an adequate amount of movement for the purposes herein described. After the toggle linkage has been actuated as just described, the gear 36 will move to the upper phantom position thereof denoted by the reference numeral 360 in FIG. 2, and at that time the gear 36 will mesh with the gear 191 which is driven by a rotary air cylinder 192. Energization of the rotary air cylinder 192 is operative to rotate gear 36 (when it is in position 360) and thus to rotate shaft 102 to perform an insulator unloading sequence as has been described in detail hereinabove. It will be understood, of course, that at the time the gear 36 is moved from its initial elevated position (indicated by the position denoted by numeral 355) to its second elevated position where gear 36 meshes with gear 191, the upper spindle 169 (see FIG. 12) will have moved downwardly in order to pull rods 108 downwardly relative to tube 34 and thus move the lower end cap associated with the arbor structure to its open position. Similarly, the upward movement of spindle 188 and shaft 102 relative to the frame member 39 (see FIG. 12) is operative to raise or open the upper cap member of the mechanism 78. Since tube 304 is rigidly connected with the arbor 86 as peviously described and is supported by frame member 39 in a manner to prevent relative axial movement therebetween, the actuation of the toggle linkage of FIG. 12 causes the end caps to move to their open positions without concomitant axial movement of the main arbor body. After insulators have been deposited in the slots of the stator by reason of the rotation of gear 36 by gear 191, gear 191 is reversely rotated to its original position. Thereupon, the cylinder 177 (see FIG. 12) is deactuated and the spindles 169, 188 are returned to their normal relative positions as shown in FIG. 12.

With reference now to FIG. 11, it is noted that the rotational position and action of the rods 108 and tubes 34, 128 are controlled by the action of a gear 197 which meshes with a gear 198 and the rotary motion of which is imparted to the rods 108 and tubes 34, 128. Moreover, the tubes 34, 128 and rods 108 are free to slide upwardly and downwardly relative to the frame member 81 and a drive sleeve 199 attached thereto by means of a bearing 201. It will be noted that the outer race of the bearing 201 is held fixed to the frame member 81 by means of a bearing retainer 202. The drive sleeve 199 is supported against axial movement at the bottom end thereof by a bearing 204, the outer race of which is held by means of a retainer 203 to the housing 33.

Assembled with the drive sleeve 199 for movement therewith are the gear 198, a shot pin ring 206, and a switch plate 207. The switch plate has four relieved areas therein at equally spaced locations therearound, and when the spring loaded roller 108 of switch 209 moves into such depressions a signal is delivered to shot pin cylinder 211 which drives shot pin 212 forwardly into one of four evenly spaced shot pin openings that are formed in the shot pin ring 206. Thus, assuming that the motor driving gear 197 is operating to rotate the drive sleeve 199, after 90 degrees of rotation of the drive sleeve 199, the switch 209 will deliver a signal which deenergizes the driving motor for gear 197 and which also causes the shot pin 212 to move into a locating notch in the shot pin ring 206. The shot pin thus establishes a fixed stop position of the drive spindle 199.

When an appropriate signal is given indicating that the tube 128 should be indexed 90 degrees to receive a subsequent insulator, a signal to cylinder 211 causes shot pin 212 to be retracted, and the driving motor for gear 197 is energized. Then, after an additional 90 degrees of rotation, switch 209 is operative to again change a condition in the state of cylinder 211 and of the driving motor for gear 197. Thus, the shot pin will again pecisely locate the device 78. Thereupon, an insulator will be loaded onto the arbor of device 78.

The interior of drive sleeve 199 is machined to provide an internal keyway 213 and a key 214 disposed therein (and fastened to the drive sleeve 199 by screws as shown) projects into an external longitudinally extending keyway 215 that is formed along substantially the entire length of the tube 34. Thus, rotational movement of the drive sleeve 199 is transmitted by means of key 214 to the tube 34 even though the tube 34 is free to move longitudinally relative to drive sleeve 199 because of the external keyway 215. The inner bore of the drive sleeve 199 is oversize relative to the outer diameter of tube 34, so a bronze bushing 216 (having an opening therein for accommodating key 214) provides a bearing surface along which the tube 34 may slide. A bronze bushing 217 is also carried at the upper end of tube 34, and this bushing provides a bearing surface along which the shaft 102 is free to both rotate and axially slide. The drive sleeve 199 and the flanges 56, 57 of the tubes 128, 34 are provided with holes along which the rods 108 extend, and these holes are sufficiently oversized relative to the outer diameter of the rods 108 that the rods 108 are free to slide axially therealong when desired.

With reference now to FIGS. 1, 2 and 13-19, the mechanism that is utilized for intermittently advancing insulators in the apparatus 30 to the inserting mechanism 78 will be described. Initially referring to FIG. 2, a main drive transmission 63 is suspended from lower main frame member 81. This transmission includes a rotary cylinder driven crank arm 64 connected to a drive linkage 68 which oscillates about its pivot point 69. A pair of limit switches 71, 72 are energized by an actuator 66 driven by the motor which drives the crank arm 64 and at each extreme of movement of arm 64 (and thus link 68) signals from the limit switches 71, 72 are used in the control of the drive motor that provides the motive force for the arm 68. As will be better understood after considering the description presented hereinbelow, the arm 68 moves to the right (as viewed in FIG. 2), limit switch 72 is closed, and the arm 68 dwells while an insulator is severed from the chain. Thereafter, arm 68 swings to the left (as viewed in FIG. 2), switch 71 closes, and the arm 68 again dwells while the mechanism 78 indexes to become positioned for receipt of another insulator. Thereupon, arm 68 swings to the right to feed another insulator into the mechanism 78; and the above described steps are repeated until the device 78 is fully loaded with a predetermined number of insulators. Then the arm 68 finally dwells with limit switch 71 closed, until the mechanism 78 has raised, insulators are transferred from mechanism 78 to a core, and the mechanism 78 has again returned to the insulator loading station.

Figure 13:
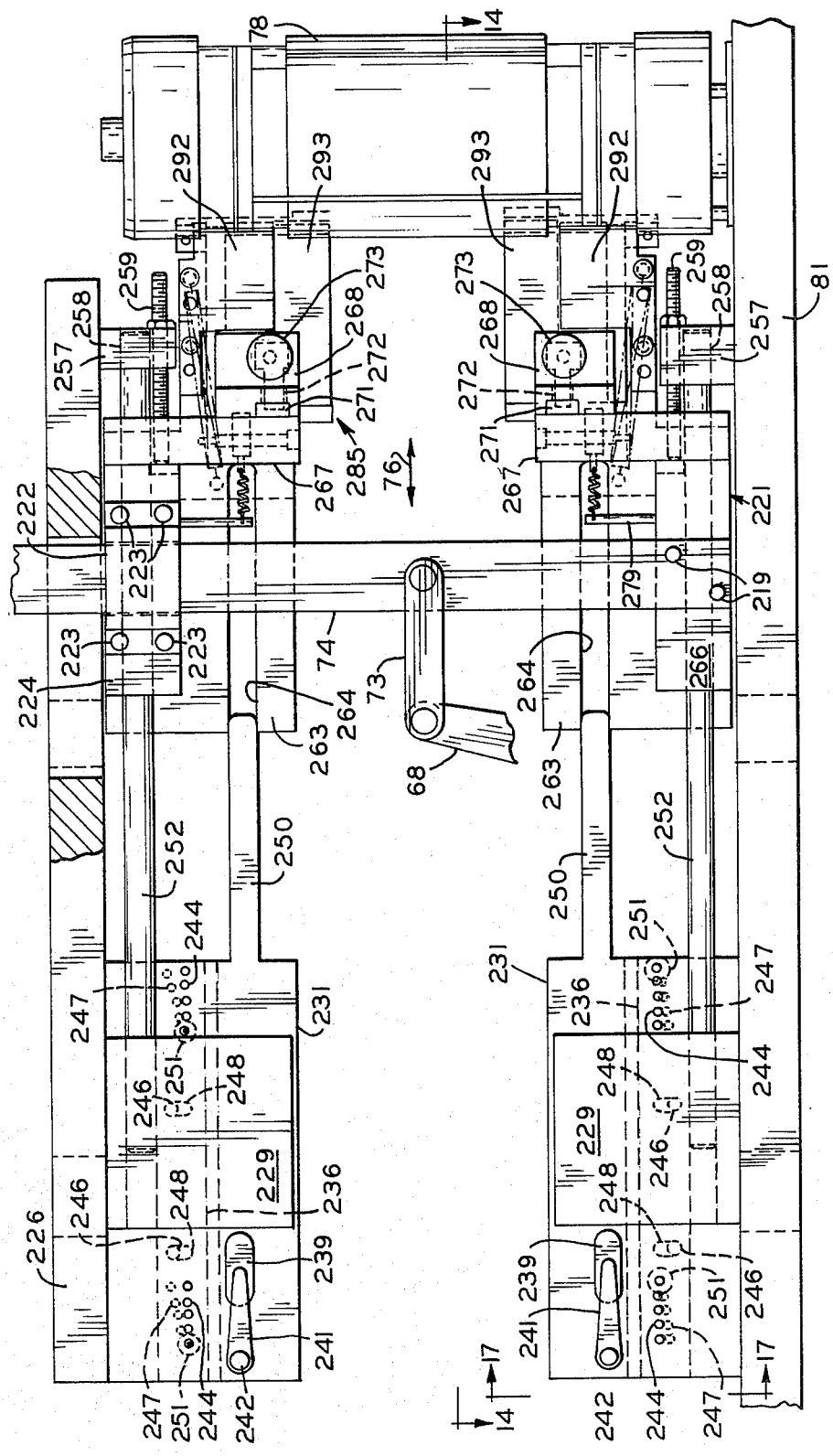
FIG. 13 is a fragmentary enlarged view of other parts of the apparatus of FIG. 2.
Figure 21:
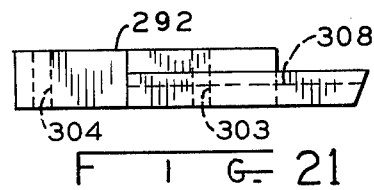
FIGS. 21–23 are detail views of one of the parts shown in FIGS. 19 and 20.
Figure 22:
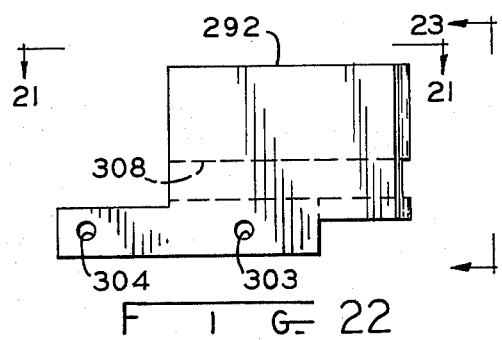

With reference now to FIG. 13, the upper end of the arm 68 is interconnected by link 73 to a drive bar 74 which will oscillate in the directions represented by arrow 76 in response to movement of the drive arm 68. The drive bar 74 is fastened at the its lower end thereof, as viewed in FIG. 13, by means of screws 219 to a movable carriage 221. On the other hand, the upper end of the drive bar 74 as viewed in FIG. 13 is held, with a sliding fit, by a clamp 222; and clamp 222 in turn is fastened by means of screws 223 to an upper movable carriage 224. The upper track and the upper movable carriage 224 are fastened to and supported by an upper mounting plate 226, while the lower movable carriage and track associated therewith are supported by the lower main frame member 81. With brief reference for a moment to FIG. 2, it will be seen that the upper plate 226 is guided for a vertical adjusting movement by means of bushings 227 carried on guide rods 228 while the main frame member 81 is, of course stationary.

As the arm 68 moves to the right as viewed in FIG. 13, an insulator is advanced into mechanism 68; and the leading insulator is then severed while the arm 68 momentarily dwells at its fully advanced position. With continued reference to FIG. 13, it will be understood that except for the mounting differences and the structure associated with establishing the driving interconnection with the drive arm 74; the upper and lower carriages and associated track structure shown in FIG. 3 are made up of the same parts, and that the structures shown in FIG. 13 are mirror images of one another. Thus, the description now to be presented will be pertinent to both the upper and lower track and carriage mechanisms of FIG. 13, and the same reference numerals will be utilized to denote corresponding upper and lower parts.

With initial emphasis on the stationary structure shown to the left in FIG. 13, it will be understood that a fixed support 229 is provided which supports a front plate 231 and a back plate 232. The relationships of these parts may be better understood by comparing the arrangement of parts shown in FIGS. 13 and 17.

From FIG. 17 it will be seen that the fixed support 29 has fastened thereto, by means of screws 233, a sandwich structure that includes the front and back plates 231, 232, and a support member 234. When the structure of FIG. 17 is actually being utilized, the lower edges 235 of the insulators in an insulator chain 20 (see FIG. 1) slide along the upper surface 236 of the lower support 234. The insulating portion 24 (see FIG. 1) thus slides along the region 237 (see FIG. 17) and the filamentary type connectors 25, 26 of the insulators extend from the region 238 in FIG. 17. The insulator portions 23, 24 (see FIG. 1) are frictionally engaged within the structure shown in FIG. 17 by means of a spring loaded pressure block 239. The block 239 is resiliently urged against the back plate 234 by means of a spring 241 which is fastened to the front plate 231 by a screw 242. As will be understood, the front plate 231 is provided with a slot 243 through which the pressure block 239 extends.

With reference to FIG. 13, it will be seen that the front plate 231 and rear plate 232 are each provided with a series of small holes 244, and a pair of slightly larger holes 246. On the other hand, the track member 34 is provided with a series 47 of holes that appear at staggered elevations and two slots 248. Small pins 249 are carried by the holes 246 in the front and rear plates 213, 232 and the pins 249 are accommodated in the slots 248 within the center track member 234. When the members 231, 232, and 234 (as viewed in FIG. 17) are initially assembled, the center track member 234 is free to move upwardly and downwardly between limits of movement determined by the slots 248 in the center track member which traps the pins 249. The actual location of the center track member 234 relative to the front and rear tracks members 231, 232 is established by raising or lowering the center track member 234 relative to the front and back plates 231, 232 to a desired relative position whereupon one of the series of holes 244 will be aligned with the staggered series of holes 247. When the center track member 234 is in the relative position with respect to plates 231, 232 that is desired, a pin 251 is inserted through the holes that are aligned. This pin 251 then will maintain the desired relative positions of the center plate 236 with respect to the front and rear plates 231, 232. Thereafter, the center track member 234 will be repositioned only when required because of changes in the dimensions of an end insulation piece 24 (see FIG. 1) for a different chain of insulators.

The front plate 231 includes a guide tongue 251 which slides along a slot 264 in the plates 262, 263 (best revealed in FIG. 13), and the fixed support 229 has fastened thereto a pair of fixed guide rods 252 (see FIGS. 13 and 18). As will be appreciated from FIGS. 14 and 18, the tongues 250, 254 of the front and back plates 231, 232 are spaced apart a sufficient distance to establish a gap 256 therebetween along which connectors 25, 26 of a chain of insulators will move.

With reference for a moment only to FIG. 14, it will be understood that parts have been removed and broken away from the structure there shown in order to increase comprehension of the entire mechanism that is shown in FIGS. 18 and 19. Thus, in FIG. 14, a fixed support 257 is readily apparent, and the fixed support 257 has fastened thereto the ends of guide rods 252. The guide rods may be secured to the fixed support 257 and the rear fixed support 229 in any suitable fashion. In one specific reduction to practice of the invention, the supports 229, 257 were provided with small threaded holes that intersected the openings which accommodated the rods 252, and set screws were then threaded into such threaded holes until they locked the rods 252 to the fixed supports 229, 257.

The fixed support 257 also carries an adjustable stop in the form of a screw 259 threadably received therein and locked in position by means of a jam nut 261. The screw 259 serves a purpose that will be described in more detail hereinbelow.

With continued reference now to FIG. 14, the movable carriage 221 has fastened thereto a movable backup plate 262 and a movable front plate 263. The plates 262 and 263 are fastened by means of not shown screws to the carriage 221 and thus are movable therewith. Accordingly, as the drive bar 74 (see FIG. 13) moves backward and forward, the carriage 221 and plates 262 and 263 move back and forth in a direction parallel to and along the guide rods 252. It will be understood that slots 264 are provided in the movable front and back plates 263, 262 which slidably accommodate the tongues 250, 254 as the carriage 221 moves to and fro.

The carriage block 221 itself includes a base portion 266, a vertically extending portion 267 fastened to the base, and a cutter support 268 which is fastened to the vertical portion 267. The cutter support has a channel 269 formed therein along which a cutter bar 271 is accommodated. The cutter bar in turn has a small socket formed therein in which an end of a cutter actuator 272 is seated, the cutter actuator extending through a slot formed in the cutter support 268 to permit movement of the actuator as a small air cylinder 273 is selectively actuated.

The vertical portion 267 of the carriage is machined in the central portion thereof as best illustrated in FIGS. 15 and 16 in order to accommodate an insulator pushing finger 274. The finger 274 in turn is mounted to the vertical member 267 by means of a pivot pin 276. As will be apparent from a comparison of FIGS. 14–16 and 13, the pusher finger 274 is normally urged toward the position thereof shown in FIG. 15 by means of a spring 277. One end of spring 277 is fastened to pin 278 (affixed to finger 274) and the other end of the spring 277 is fastened to a pin 279 which is affixed to portion 266 of the carriage 221. In a normal operational sequence of the mechanism revealed in FIGS. 15 and 16, a fingertip 281 will be positioned as shown in FIG. 15 with the tip 281 projecting into a slot 29 (see FIG. 1) between two adjacent insulation pieces. It will be observed (see FIG. 15) that the tip of the finger 281 which projects through a slot 29 is accommodated in a notch or relieved area 282 formed in the movable backup plate 262. With the parts in the relative positions shown in FIG. 15 (and with the cutter revealed in FIG. 14 in a retracted inoperative position), the entire carriage 21 is advanced to the right as viewed in FIG. 14 (under the action of arm 68—see FIGS. 2, 13). Since the fingertip 281 will be engaged in a notch 29 between adjacent insulators, the insulator chain 20 will be advanced to the right and the leading end of a leading insulator will be disposed in the transfer mechanism 78. It will be appreciated that the carriage 221 includes the movable backup plate 262 and front plate 263. Moreover, the plates 262 and 263 will move to the right as viewed in FIG. 14 during the advancing stroke. During this advancing stroke, the carriage 221 slides along the guide rods 252, and the tongues 250, 254 (see the top portion of FIG. 14 and FIG. 13) will be relatively positioned at the end of the advancing stroke as revealed in FIG. 13. The leading end of the leading insulator on the insulator chain 20 enters the transfer device 78 by sliding past the closed fingers 88 (see FIG. 6), and the cutter cylinder 273 is actuated to sever the leading insulator from the chain, and to form a cut edge 284 at the leading end of the next insulator (see FIG. 1). The cylinder 273 may, if desired, be actuated in response to a signal from switch 72 (see FIG. 2) as it is closed.

After the leading insulator is severed, the cylinder 273 retracts, and the carriage 221 is returned to its initial position by being moved to the left as viewed in FIG. 14 under the action of arm 68 (see FIG. 13). At this time, the rear surface 283 of the finger 274 will slide out of the groove 229 between insulators against the bias of spring 277 (see FIGS. 15, 16) and the insulating end piece (piece 23 or 24 as the case may be, see FIG. 1) will hold the finger 274 away from the notch 282 (as viewed in FIG. 16) until the end of the retraction stroke of carriage 221. With reference to FIG. 16, the end of the retraction stroke will occur as the fingertip 281 becomes aligned with the notch 29 (at the trailing end of the next leading insulator) at which time the relieved area 282 will also be positioned adjacent to the notch 29. Thus, at the end of the retraction stroke the finger 274, plates 262, 263 and related parts will once again be in the position illustrated in FIG. 15, with the fingertip 281 being disposed in a notch 29 in preparation for a subsequent feeding or advancing stroke of carriage 221. When the carriage 21 retracts, it slides past the chain of insulators confined within the above mentioned trackways and plates because of the frictional drag applied to the insulator chain by the previously discussed pressure block 239. This drag prevents the insulators from moving with the carriage during the retraction stroke of the carriage.

Although the insulating end pieces typically may be formed of only five to ten mil thick polyethylene terephthalate (sold e.g., under the tradename MYLAR) the clearances between the strip like insulators and the guidetracks are sufficiently close that the polyethylene terephthalate is prevented from buckling as the carriage 21 moves from its fully advanced position to its fully retracted position.

In an actual reduction to practice of the invention, an additional telescoping structure was utilized to bridge the gap between the ends of the plates 262, 263 and transfer device 78 as viewed in FIG. 14. This bridging mechanism is shown in FIGS. 17, 19, 20, and the assembled relationship of the bridging mechanism with respect to carriage 21 is revealed in FIG. 18.

FIG. 19 illustrates one specific telescopic bridging assembly 285 which is fastened by means of screws 286, 287 to the plates 262, 263. For purposes of orientation, brief reference is now made to FIG. 14 and to the tapped holes 288, 289, 300, 310 in the plates 262, 263 respectively. It is the holes 288, 289, 300, 310 into which screws 286, 287, 315, 306 are threaded in order to fasten the assembly 285 to the leading end of the plates 262, 263.

With reference to FIG. 20, it will be understood that the telescopic assembly includes four main parts, two of which are fixedly attached by means of the screws 286, 287, 306, 315 to the plates 262, 263; and two of which are telescopically movable with respect to the plates 262, 263. The fixed members (vis-a-vis plates 262, 263) are the outer members 291, 292 as viewed in both FIGS. 19 and 20; whereas the members movable relative to the plates 262, 263 are the slide members 293, 294. It will be noted that a spring 296 is fastened to the screw 286 and a screw 297 that is carried by the slide member 294. When the parts of FIG. 19 are in the relative positions illustrated therein (as well as in FIG. 18) the spring 296 is in tension and tends to urge the slide members 294 and 293 to the right as viewed in FIGS. 18 and 19. Thus, as the plates 262, 263 move to the left (as viewed in FIGS. 18 and 19) in preparation for advancing a new insulator toward the mechanism 78, the tension in spring 296 will tend to hold the slide members 293, 294 in a position closely adjacent to the mechanism 78 as shown in FIGS. 18 and 19. Subsequently, when the plates 262, 263 advance to the right (as viewed in FIGS. 18 and 19) during the advance of an insulator into the mechanism 78; the spring 296 will be stretched and placed once again under increased tension. The plate 293 is constrained to be in the same relative position (with respect to plates 262, 263) as the slider member 294 because the members 293, 294 are fastened together at the lower leading ends thereof by means of a screw 298 which is threaded into hole 299 in member 294 and hole 301 in member 293 (see FIG. 20).

The slidable members 293, 294 establish a gap 302 therebetween along substantially the entire extent thereof (see FIG. 19). It will be noted from FIG. 20 that the plates 262, 263 establish a relatively narrow gap 305 which accommodates the end insulation portions 23 or 24 or an insulator. Thus, the plates 262, 263 guide the flat insulating portions of the insulators being advanced into the mechanism 78, whereas the slideable members 293, 294 provide a guide for the connector portions 25, 26, of each insulator as it is being loaded onto the mechanism 78.

FIGS. 21 through 32 collectively present three different views of each of the four major pieces 291, 292, 293, and 294 of the telescopic assembly 285. For purposes of orientation, part 292 appears in FIG. 21 in the same general orientation as in FIG. 19. Thus the orientation of part 292 in FIG. 23 corresponds to the orientation of the same part in FIG. 20. Thus, the holes 303, 304 that accommodate the screws 287, 306 (see FIG. 19) further assist in establishing the relative orientation of the parts in FIGS. 21–22 relative to FIGS. 19 and 20.

Figure 23:
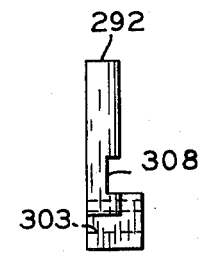
Figure 24:
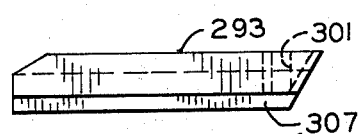
FIGS. 24–26 are detail views of another one of the parts shown in FIGS. 19 and 20.
Figure 25:
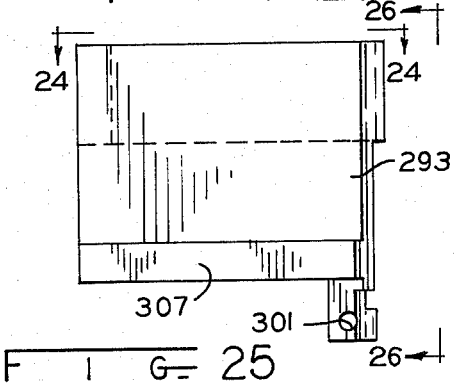
Figure 26:
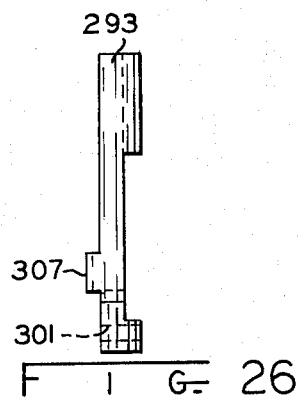

Turning now to FIGS. 24–26, it will be appreciated that slidable member 293 is provided with a tongue 307 which slides along the groove 308 of part 292 (see FIG. 23).

Figure 27:
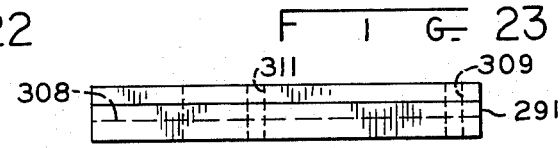
FIGS. 27–29 are detail views of another one of the parts shown in FIGS. 19 and 20.
Figure 29:
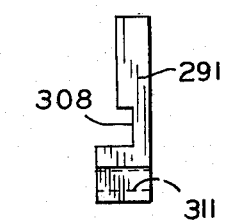
Figure 28:
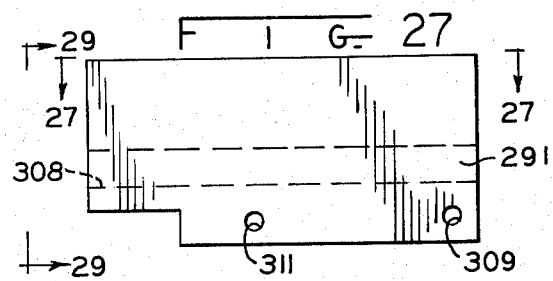

With reference now to FIGS. 27–28 it will be appreciated that part 291 appears in FIG. 27 in the same relative orientation thereof as it appears in FIG. 19; and it appears in FIG. 29 in the same relative orientation as in FIG. 20. It will be noted that a groove 308 is provided in the part 291, and this groove interfits with a tongue in part 294 as will be explained hereinbelow. Before departing from the discussion of FIG. 28, it is finally noted that the hole 309 accommodates the screw 286 and that the hole 311 accommodates the screw 315.

With reference now to FIGS. 30–32, it will be noted that part 294 appears in FIG. 32 in the same relative orientation thereof as in FIG. 20; and that FIG. 31 is a view of part 294 as it appears in FIG. 32 when looking to the left in FIG. 32. In addition, FIG. 30 is a plan view of FIG. 31. Because of the positioning of the views for part 294 in FIGS. 30–32, the part 94 appears in FIG. 30 in an inverted relationship as compared to the orientation of this same part 294 in FIG. 19. Thus, while the hole 312 for screw 297 (see FIG. 19) is toward the left end of part 294 as viewed in FIG. 19, the same hole appears towards the right end of part 294 in FIGS. 30 and 31. The tongue 313 that is readily visible in both FIGS. 20 and 32 is slidably received in the groove 308 of the part 291 (see FIG. 29), as mentioned hereinabove. Finally, it will be noted that a depending tongue portion 314 serves as a stop (which abuts against screw 59 in FIGS. 13, 14) in order to limit movement of the telescoping parts 293, 294 toward the mechanism 78 as viewed in FIGS. 13, 18, and 19.

With reference to FIGS. 13 and 14, it will be recalled that a screw 59 previously was mentioned hereinabove. The screw 59 actually constitutes an adjustable abutment against which the tongue 314 of part 294 bears. Thus, for a given transfer mechanism 78, the screw 59 will be adjustably positioned in its carrier and thereby position the telescoping parts 294, 293 so that they will be in close proximity to the mechanism 78 but not in interferring relationship therewith.

Figure 33:
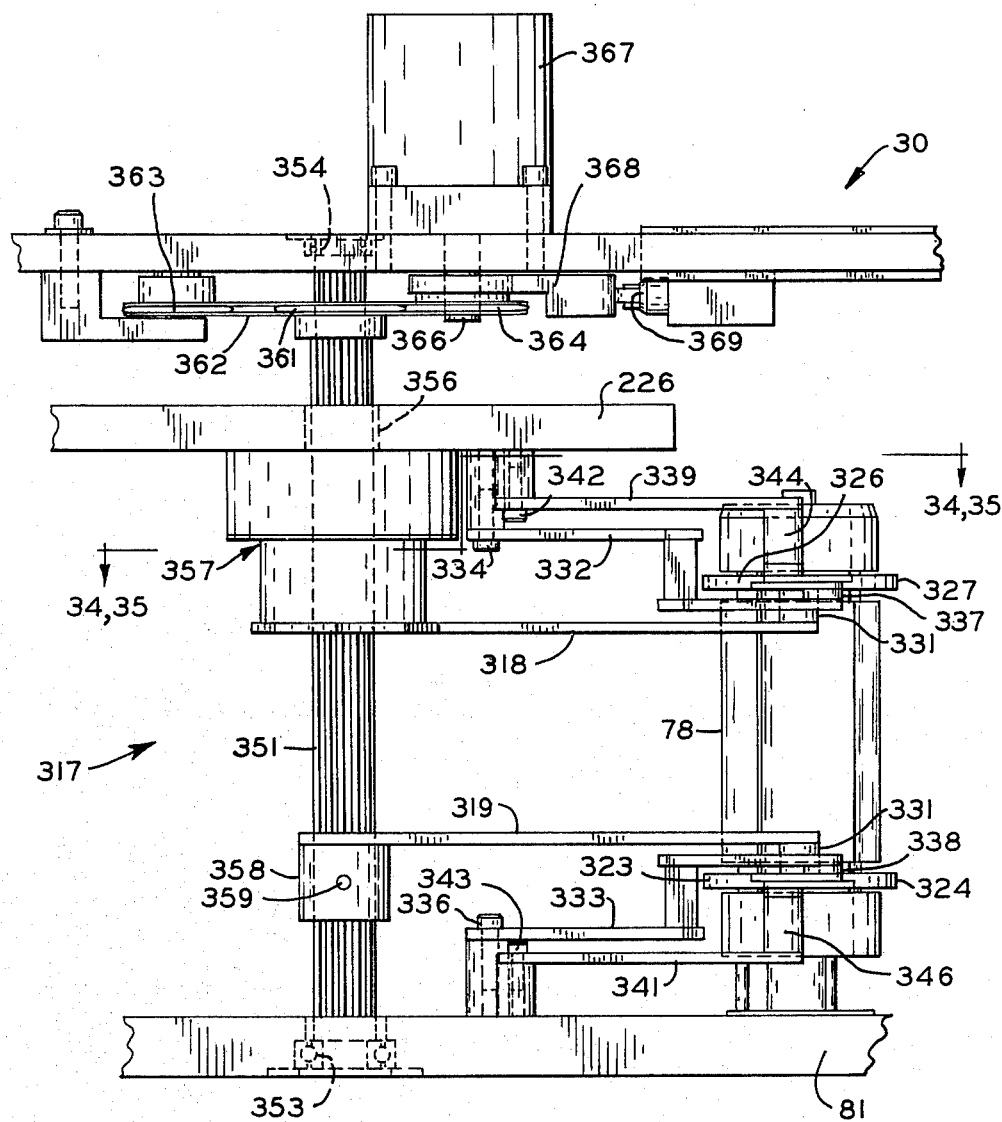
FIG. 33 is an enlarged view, with parts omitted and parts broken away, of a portion of the apparatus shown in FIG. 2.
Figure 34:
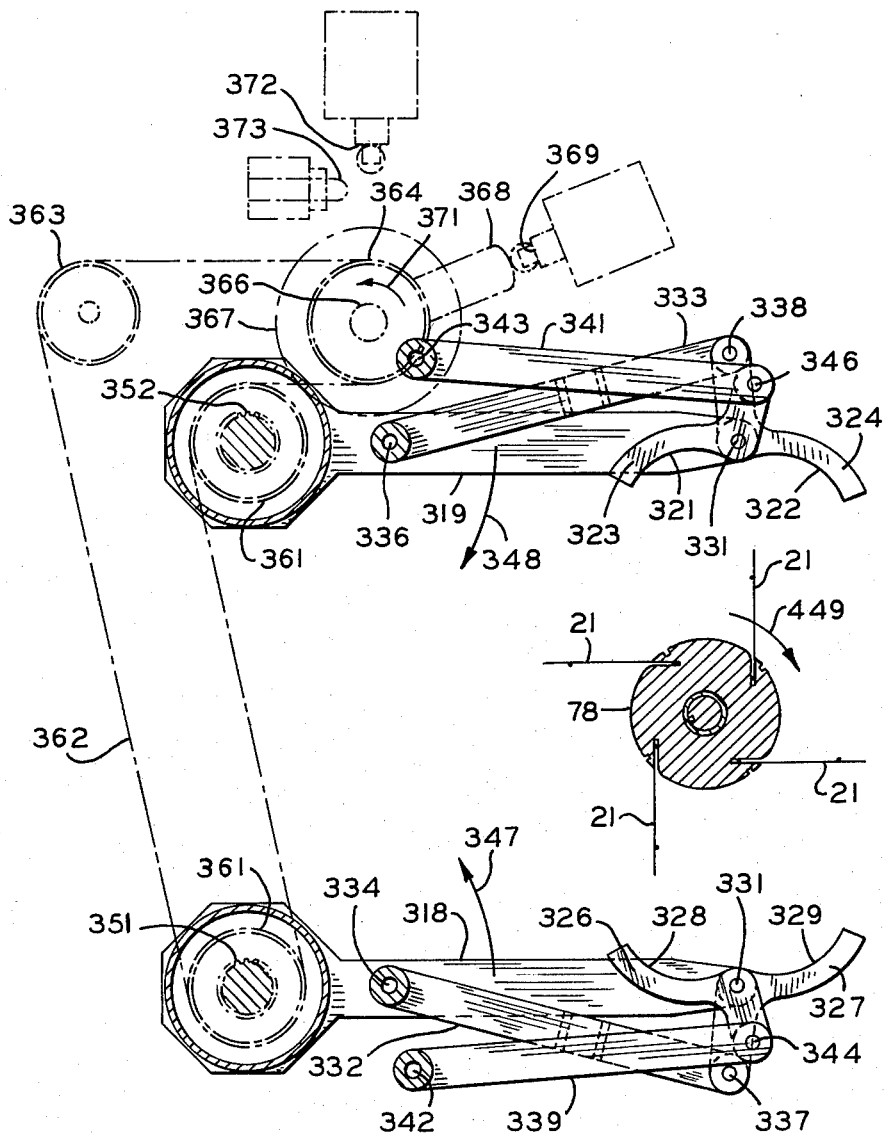
FIG. 34 is a view taken in the direction of lines 34—34 in FIG. 33, but with parts removed for clarity.
Figure 35:
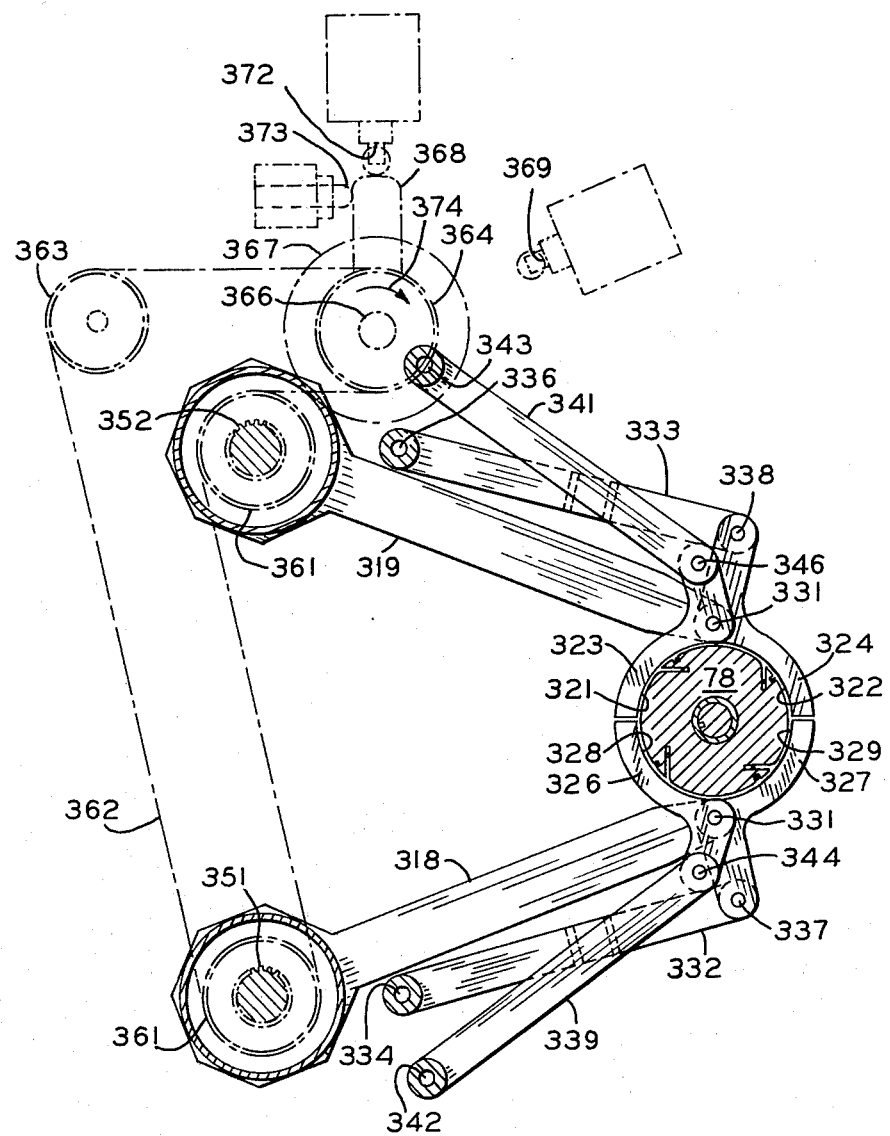
FIG. 35 is a view similar to FIG. 34, but wherein the parts are shown in different relative positions.

With reference now to FIGS. 1, 2, and 33–35; an insulator wrapping mechanism generally denoted by the reference numeral 317 will be described. It will be understood that after a predetermined number of insulators have been loaded onto the transfer device 78 (four insulators in the case of the specific mechanism 78 illustrated herein); the arbor containing the insulators is rotated while the upper and lower caps are open, the portions of the insulators extending outwardly from the mechanism 78 are wrapped around the body of the arbor; and then, while the insulator portions extending from the arbor are held in close wrapped relationship with the arbor, the end caps are closed in order to retain the insulators wrapped closely about the arbor. The mechanisms controlling the appropriate opening and closing of the caps of the device 78, and the mechanism by which the entire mechanism 78 is spun during the wrapping sequence has been described hereinabove. However, the means by which the insulators are wrapped about the arbor of the mechanism 78 are shown in FIGS. 33–35. In effect, eight arcuate curved surfaces are brought into increasingly close proximity with the mechanism 78 while it is spinning, and as the arcuate surfaces are brought into proximity with the spinning arbor and the insulators projecting therefrom (which are spinning therewith), the arcuate surfaces are moved to establish a close clearance about the periphery of the arbor (at its upper and lower ends) and with the insulating portions of the insulators confined between the arcuate surfaces and the rotating arbor.

The eight arcuate surfaces just mentioned are provided by a mechanism 317 (now see FIG. 33) which includes numerous parts that are virtually identical with one another. Thus, the same reference numerals are used herein to denote identical parts of mechanism 317. For example, a pair of upper actuator arms 318, 319 are provided—one of which is hidden from view in FIG. 33. However, both of the arms 318, 319 are readily apparent in FIG. 34. Similarly, a pair of lower actuator arms are provided which functionally are identical with the respective ones of the arms 318, 319 and which underlie the arms 319, 318. Accordingly, the lower actuator arm visible in FIG. 33 has been denoted as an arm 318. Thus, when comparing FIGS. 33 and 34, it should be understood that an upper pair of arms 318, 319 only can be seen but that essentially mirror images of each of the parts shown in FIG. 34 are positioned directly underneath those parts in the assembled apparatus of FIG. 33.

Referring to FIG. 34, one set of arcuate surfaces 321, 322 are defined by a pair of opposed members 323, 324 that form a clamshell type of mechanism. Corresponding members 326, 327 carried by control arm 318 also define arcuate surfaces 328, 329 of a clamshell type of mechanism in the lower portion of FIG. 34.

It will be understood from a review and comparison of FIGS. 33 and 34 that bosses or spacers 331 hold the clamshell halves 324, 327 in spaced relationship relative to the main drive arms 318, 319; and that intermediate offset arms 332, 333 extend from their respective pivotal mounting locations 334, 336 and are connected by pivot pins 337, 338 respectively to the clamshell halves 327, 324. Similarly, arms 339, 341 are pivotally held at a fixed location at one end 342, 343 thereof, and are attached by means of pivot pins 344, 346 respectively to the ends of clamshell halves or arms 326, 323 respectively. Thus, when the arms 318, 319 are driven in the direction of arrows 347, 348 respectively, the clamshell arms 326, 327, 323, 324 will be moved and closed about the arbor of the mechanism 78 as clearly revealed in FIG. 35. It will be understood that the clamshell arms are not closed until after the mechanism 78 has been loaded with phase insulators as depicted in FIG. 34; and that the clamshell arms are then closed only after the mechanism 78 has commenced to spin in the direction of arrow 449 (see FIG. 34). Thus, it should now be understood that while the mechanism 78 is spinning, the clamshell arms move toward the mechanism 78. Moreover, the moving of the clamshell arms from their open configuration (shown in FIG. 34) to their closed configuration (shown in FIG. 35) causes the insulators projecting from the mechanism 78 to be wrapped about the arbor in pin wheel fashion, and held closely adjacent thereto as the mechanism 78 comes to a stop. Then, while the clamshell arms remain in their closed configuration, the upper and lower retaining caps of the mechanism 78 (described hereinabove) are moved to their closed or retaining position in order to retain the insulators wrapped about the surface of the mechanism 78.

Thereafter, the clamshell arms are moved to their remote, open positions (as shown in FIG. 34), and the mechanism 78 is raised to its elevated position whereupon insulators are transferred from the mechanism 78 to a stator assembly interfitted therewith (as depicted in FIG. 2).

The mechanism by which the clamshell driving arms 318, 319 are moved from their operative positions shown in FIG. 35 to the "ready" or "dwell" positions shown in FIG. 34 will now be described with reference to FIGS. 2 and 33-35. Two of the arms 318, 319 are interconnected with a vertically extending spline 351 near the front of the apparatus as best seen in FIG. 33. The other two arms 318, 319 are supported on a vertically extending spline 352 near the rear of the apparatus as revealed in FIG. 34.

The mechanisms, bearings, couplings, etc. associated with the spline 351 are identical with those associated with the spline 352, so the following discussion concerning spline 351 and parts associated therewith also will be descriptive of the spline 352 and its associated parts. At the outset, it is noted that the lower end of the splines are supported in bearings 353 carried by the lower frame member 81; and by bearings 354 at the upper ends thereof (see FIG. 33). With reference to FIGS. 2 and 33, the movable upper plate 226 has a pair of openings 356 therein sufficiently large to permit the splines 351, 352 to rotate therein. In addition, the movable upper plate 226 carries bearing assemblies 357 which suspend the upper arms 318, 319 therefrom so that the upper arms 318, 319 will be movable upwardly and downwardly with the plate 226 as it is moved upwardly and downwardly. However, the upper arms 318, 319 are also provided with internal teeth which may slide along and also mesh with the splines 351, 352. Thus, the upper arms 318, 319 are movable as previously described in connection with FIGS. 34 and 35 in response to rotary movement of the splines 351, 352.

The lower arms 318, 319 are each carried on their respective splines 351, 352 by means of collars 358 fixed to the splines so that the vertical position (as viewed in FIG. 33) of the lower arms 318, 319 is semi-permanently established. While set screws 359 (or any other suitable means) interlock the lower arms 318, 319 with the splines; the collars 358 and lower arms 319, 318 may be splined to intermesh with the spline shafts 351, 352.

The upper end of each of the splines 351, 352 carry sprockets 361 (see FIGS. 2, 33 and 34). Reeved around the sprockets 361 is a chain 362 which also passes around an idler sprocket 363 and a drive sprocket 364 (see FIG. 34). The drive sprocket 364 is attached to the shaft 366 of a reversible motor 367 and thus when motor 367 is energized, the sprocket 364 will be driven in the desired direction by the reversible motor. For purposes of controlling the motor 367, a limit switch actuator—mandatory or protected mechanical stop member 368 is attached to the motor shaft. When the clamshell arms are in their fully retracted, fully opened positions as shown in FIG. 34, the limit switch actuator—mechanical stop 368 holds limit switch 369 closed. This provides a signal which indicates that the arms 318, 319 are in their fully retracted position and that it is safe to elevate the mechanism 78 from the insulator loading station to the insulator transferring station.

In order to close the arms 318, 319, after the desired number of insulators have been loaded onto the mechanism 78, the motor 367 is actuated to drive the sprocket 364 in the direction of arrow 371 in FIG. 34. This action swings the arms 318, 319 in the direction of arrows 347, 348; and also swings the limit switch actuator—mechanical stop 368 into a position to close the limit switch 372. Switch 372 thereupon produces a signal to deactivate the motor 367. In addition, the mechanical stop portion of the arm 368 strikes against a fixed abutment 373, as the switch 372 closes, and mechanically limits the extent of travel of arms 318, 319. The provision of mechanical stop 373 protects the mechanism 78 from being actually contacted by the clamshells carried on arms 318, 319. After the end caps of mechanism 78 have been closed to retain insulators on the arbor mechanism 78; the motor 367 is once again activated to rotate sprocket 364 in the direction of arrow 374 (as viewed in FIG. 35) and the motor 367 remains energized until the limit switch 369 is once again closed by the limit switch actuator-mechanical stop 368 whereupon a signal produced by the limit switch 369.

With reference now once again to FIG. 2, it will be noted that the movable frame member 226 is, as hereinabove noted, supported for sliding movement by means of bushing 227 on a vertical column 228 near the front of the apparatus as viewed in FIG. 2. In addition to the column 228 shown in FIG. 2, another not shown column is provided toward the rear of the apparatus to provide a more stable supporting arrangement for the plate 226. The plate 226 has a threaded bore 277 which accommodates a threaded shaft 278; and the shaft 278 in turn is supported in bearings carried by the lower frame member 81 and the upper frame member 381. Thus, when differently sized insulators are to be handled by the apparatus 30 (i.e., insulators with longer or shorter connectors 25, 26), a hand crank 382 fixed to the upper end of the threaded shaft 378 may be turned, whereupon the plate 226 will undergo vertical movement. This movement will adjust the vertical position of the upper track and feeding mechanism shown in FIG. 13, and the upper clamshell clamping arms shown in FIG. 33. It will be understood that a different arbor having appropriate dimensions would then also be used in the mechanism 78.

It now will be understood that new and improved methods and apparatus have been disclosed which may be utilized for automatically placing individual insulators in an insulator transferring mechanism wherein such insulators are supplied in a continuous chain like form. Moreover, it will be understood that while the mechanism 78 is in the insulator loading position, the end caps thereof are open in order to receive insulators. In a normal sequence of operations, an insulator is loaded into a first location on an arbor of the mechanism 78; the loaded insulator is then severed from the chain of insulators, the arbor of the mechanism 78 is indexed to present a second location for receiving a second insulator; a second insulator is advanced and loaded into the arbor of the mechanism 78, the second insulator is severed from the continuous chain of insulators; and this sequence is continued until the desired number of insulators have been loaded into the arbor of the mechanism 78.

The indexing of the mechanism 78 for receipt of different insulators is accomplished by the intermittent application of a turning force thereto from the gear 197 carried within the housing 33 as viewed in FIG. 2 and as described herein above. After a desired number of insulators have been loaded into the arbor 78; the gear 197 commences rotation of tube 128 and thus the mechanism 78 while the previously discussed clamshell arms close (as shown in FIG. 35) to cause the insulators loaded onto the mechanism 78 to be wrapped thereabout. Thereupon, gear 197 stops and the above mentioned shot pin 212 (of FIG. 11) positively locates mechanism 78 in a reference position such that it will properly interfit with a stator at the insulator transferring station.

Before the clamshell arms release the wrapped insulators, the retaining caps 80, 82 associated with the mechanism 78 (see FIGS. 3, 4) are closed in order to hold the insulators wrapped about the arbor of the transfer mechanism. Closing of the caps 80, 82 is accomplished by extension of cylinder rod 178 (see FIG. 12) which causes movement of spindles 169, 188 in a direction to lower shaft 102 and raise rods 108. After the retaining caps have been closed, the clamshell arms are moved to a dwell position away from the mechanism 78 (see FIG. 34), and the elevating cylinder 49 (see FIG. 2) raises the sub-frame 38, 39 and accordingly moves the mechanism 78 to the elevated insulator transferring station. At this time, yoke 384 closes limit switch 383 (see FIG. 2), and a signal is provided to cause retraction of cylinder 177 and its rod 178.

When the rod 178 is retracted, the toggle mechanism carried by the lower frame member 39, 38, is operated to once again open the insulator retaining end caps 80, 82 associated with the arbor of the mechanism 78. This action of the toggle linkage also raises the gear 36 from the position thereof indicated at 355 (in FIG. 2) to the position indicated at 360 where it meshes with gear 191. Thereupon, the rotary cylinder 192 is energized so that the gear 191 driven thereby is operative to cause shaft 102 to rotate an amount necessary to actuate the cams associated with the mechanism 78. This in turn causes a releasing and ejecting of the phase insulators from the mechanism 78 into the stator core supported in phase insulator accepting relationship with respect to the arbor 86 of the mechanism 78.

After the insulators have been transferred from the arbor 86, the motor 192 returns gear 191 (and thus the cams of mechanism 78) to the initial positions thereof. Then the stator is removed and the mechanism 78 is returned to the insulator loading station by reason of retraction of the cylinder 49. When limit switch 385 is actuated by yoke 384, the apparatus is conditioned to once again perform the operational sequences that have just been described whereby insulators are once again loaded onto the arbor of the mechanism 78.

While the present invention has been described with respect to preferred embodiments of apparatus and methods useful in carrying out the present invention, numerous modifications will suggest themselves to those of ordinary skill in the art. Accordingly, the scope of the present invention is to be measured only by the claims appended hereto which form a part of this specification.

I claim:

1. A method of placing phase insulators on a magnetic core having a pair of end faces, a centrally disposed axially extending bore, and a plurality of slots extending axially between the end faces and communicating with the bore; wherein the phase insulators comprise end turn insulating portions held in spaced apart relation by connector means; the method comprising the steps of: mutually aligning a gap defined by an insulator feeding device and a first part of an insulator transfer mechanism while a first insulator is disposed in such gap in preparation for loading the leading end of the first insulator on the first part of the transfer mechanism; advancing the first insulator along the feeding device defined gap toward the transfer mechanism, and depositing the leading end of the first phase insulator on the first part of the transfer mechanism and retaining the leading end of the first phase insulator on the first part of the transfer mechanism with the trailing end of the first phase insulator projecting therefrom; moving a second insulator along the feeding device defined gap and indexing the transfer mechanism relative to the feeding device so as to align a second part of the transfer mechanism with the feeding device defined gap in preparation for receipt of the leading end of the second insulator from the feeding device; feeding the leading end of the second phase insulator onto the second part of the insulator transfer mechanism and retaining the leading end of the second phase insulator on the second part of the transfer mechanism with the trailing end of the second phase insulator projecting therefrom; continuing to index the transfer mechanism and to align the feeding device defined gap and other transfer mechanism parts, and continuing to feed insulators from the feeding device defined gap and retain the leading ends of such phase insulators on the other parts of the transfer mechanism with the trailing ends of such phase insulators projecting from the transfer mechanism until a predetermined number of phase insulators are carried and retained by the transfer mechanism with the trailing ends thereof projecting therefrom; wrapping the trailing ends of the predetermined number of insulators about the transfer mechanism and holding the trailing ends of the predetermined number of insulators closely adjacent to the transfer mechanism; interfitting the transfer mechanism with the magnetic core along the bore of the core in mutually aligned relationship; and transferring the insulators from the transfer mechanism to the magnetic core.

2. A method of placing phase insulators on a magnetic core having a pair of end faces, a centrally disposed axially extending bore, and a plurality of slots extending axially between the end faces and communicating with the bore; wherein the phase insulators comprise end turn insulating portions held in spaced apart relation by connector means; the method comprising: depositing the leading end of a plurality of phase insulators on an insulator transfer mechanism and retaining the leading ends of the phase insulators on the transfer mechanism with the trailing ends of the phase insulators projecting therefrom; spinning the transfer mechanism and the insulators retained thereon, and engaging and deflecting the trailing ends of the spinning insulators into close proximity with the transfer mechanism, and thereby wrapping the trailing ends of the plurality of insulators about the transfer mechanism; ceasing the spinning of the transfer mechanism and the insulators retained thereon in close proximity thereto; holding the trailing ends of the plurality of insulators in close proximity with the transfer mechanism; interfitting the transfer mechanism with the magnetic core along the bore of the core in mutually aligned relationship; and releasing the trailing ends of the insulators from the transfer mechanism and transferring the insulators from the transfer mechanism to the magnetic core.

3. A method of placing individual phase insulators from a chain of insulators on a magnetic core having a pair of end faces, a centrally disposed axially extending bore, and a plurality of slots extending axially between the end faces and communicating with the bore; wherein the chain of phase insulators comprises a first plurality of end turn insulating portions mutually spaced apart at the ends thereof by a gap and interconnected with one another adjacent to each gap by a web, a second plurality of end turn insulating portions mutually spaced apart at the ends thereof by a gap and interconnected with one another adjacent to each gap by a web, and wherein pairs of the first and second plurality of end turn insulators are held in spaced apart relation by connector means; the method comprising the steps of: mutually aligning an insulator transfer mechanism and an insulator feeding device; advancing the chain of insulators toward the transfer mechanism with the feeding device, depositing the leading end of a leading phase insulator on the transfer mechanism; severing the webs that connect the leading insulator to the chain, and retaining the leading end of the first phase insulator on the transfer mechanism with the trailing end of the first phase insulator projecting therefrom; indexing the transfer mechanism relative to the feeding device; depositing the leading end of the next leading phase insulator of the chain on the insulator transfer mechanism, severing the webs that connect the leading insulator to the chain, and retaining the leading end of the second phase insulator on the transfer mechanism with the trailing end of the second phase insulator projecting therefrom; continuing to index the transfer mechanism and to deposit, sever, and retain the leading ends of phase insulators on the transfer mechanism with the trailing ends of such phase insulators projecting from the transfer mechanism until a predetermined number of phase insulators are carried by the transfer mechanism; wrapping the trailing ends of the predetermined number of insulators about the transfer mechanism and holding the trailing ends of the predetermined number of insulators closely adjacent to the transfer mechanism; interfitting the transfer mechanism with the magnetic core along the bore of the core in mutually aligned relationship; and transferring the insulators from the transfer mechanism to the magnetic core.

4. Apparatus for placing individual phase insulators from a chain of phase insulators on a magnetic core having a pair of end faces, a centrally disposed axially extending bore, and a plurality of slots extending axially between the end faces and communicating with the bore; wherein each of the individual phase insulators comprise end turn insulating portions held in spaced apart relation by connector means; the apparatus comprising: an insulator feeding mechanism, an insulator transfer mechanism, and means for aligning the insulator transfer mechanism with the insulator feeding mechanism; said insulator feeding mechanism being operable to advance insulators toward the transfer mechanism and deposit the leading end of the phase insulators on the transfer mechanism; and means for retaining the leading end of the insulators on the transfer mechanism, with the trailing end of the insulators projecting therefrom; means for indexing the transfer mechanism relative to the feeding mechanism after insulators have been deposited on the transfer mechanism; means for severing each insulator deposited on the transfer mechanism; means for wrapping the trailing ends of insulators deposited on the transfer mechanism thereabout; means for holding the trailing end of the insulators deposited on the transfer mechanism closely adjacent to the transfer mechanism; and means operative for causing a transfer of the insulators from the transfer mechanism to a magnetic core.

5. Apparatus for placing phase insulators on a magnetic core having a pair of end faces, a centrally disposed axially extending bore, and a plurality of slots extending axially between the end faces and communicating with the bore; wherein the phase insulators comprise end turn insulating portions held in spaced apart relation by connector means; the apparatus comprising: an insulator transfer mechanism; means for placing the leading end of a plurality of phase insulators on the insulator transfer mechanism, said transfer mechanism including means for retaining the leading ends of the phase insulators on the transfer mechanism with the trailing ends of the phase insulators projecting therefrom; means for spinning the transfer mechanism and the insulators retained thereon; means for engaging and deflecting the trailing ends of insulators into close proximity with the transfer mechanism while the transfer mechanism is spinning with insulators thereon, thereby to wrap the trailing ends of insulators about the transfer mechanism; said transfer mechanism including means for retaining the trailing ends of the insulators on the transfer mechanism and in close proximity thereto; and means for causing insulators to be moved from the transfer mechanism to a magnetic core.

6. The apparatus of claim 5 wherein the means for placing includes a mechanism for engaging insulators and moving the insulators to the transfer mechanism, and further includes means for restraining movement of an insulator chain in a direction away from the transfer mechanism.

7. The apparatus of claim 6 wherein the means for restraining includes a spring biased pressure pad.

8. The apparatus of claim 5 wherein the means for engaging and deflecting includes a plurality of arms defining arcuate surfaces movable, from remote positions relative to the transfer mechanism, to positions more proximate to the transfer mechanism.

9. The apparatus of claim 5 wherein the transfer mechanism comprises an arbor having means for accommodating end turn insulating portions and connector means of insulators; caps for retaining end insulating portions of insulators in close proximity with the arbor;

and cam means for causing ejection of insulators from the arbor.

10. Apparatus for advancing a chain of phase insulators and placing individual phase insulators from the chain on a magnetic core having a pair of end faces, a centrally disposed axially extending bore, and a plurality of slots extending axially between the end faces and communicating with the bore; wherein the individual phase insulators each comprise end turn insulating portions held in spaced apart relation by connector means; the apparatus comprising: an insulator transfer mechanism; an insulator transfer mechanism loading station; means for guiding end turn insulating portions of the insulators in the chain along a predetermined path; means for applying a restraining force to the chain of phase insulators to inhibit movement of the chain along the predetermined path; means for moving the chain along the predetermined path toward the insulator transfer mechanism loading station; means for severing successive leading insulators from the chain; means for placing the leading end of a plurality of successive severed leading phase insulators from the chain on the insulator transfer mechanism, said transfer mechanism including means for retaining the leading ends of the phase insulators on the transfer mechanism with the trailing ends of the phase insulators projecting therefrom; means for moving the transfer mechanism after insulators have been severed from the chain, said means for moving including means for spinning the transfer mechanism and the insulators retained thereon; means for engaging and deflecting the trailing ends of insulators into close proximity with the transfer mechanism while the transfer mechanism is spinning with insulators thereon, thereby to wrap the trailing ends of insulators about the transfer mechanism; said transfer mechanism including means for retaining the trailing ends of the insulators on the transfer mechanism and in close proximity thereto; and means for causing insulators to be moved from the transfer mechanism to a magnetic core.

11. A method of placing individual phase insulators from a chain of phase insulators on a magnetic core having a pair of end faces, a centrally disposed axially extending bore, and a plurality of slots extending axially between the end faces and communicating with the bore; wherein the chain of phase insulators each comprises end turn insulating portions held in spaced apart relation by connector means, and wherein adjacent end turn insulating portions along both sides of the chain are mutually spaced apart at the ends thereof by a gap and interconnected with one another by web means; the method comprising: mutually aligning an insulator transfer mechanism and an insulator feeding device; engaging a leading insulator with the feeding device along the gap of the trailing end thereof and advancing the chain of insulators toward the transfer mechanism with the feeding device, depositing the leading end of the leading phase insulator on the transfer mechanism, severing the web means that connect the leading insulator to the chain, and retaining the leading end of the first phase insulator on the transfer mechanism with the trailing end of the first phase insulator projecting therefrom; moving the insulator feeding device along the chain in a direction away from the transfer mechanism preparatory to advancing the next leading insulator of the chain to the transfer mechanism and restraining the chain from movement while so moving the insulator feeding device; continuing to perform the steps of aligning, engaging, depositing, severing, retaining, moving, and restraining until the leading end of a preselected number of phase insulators are on the insulator transfer mechanism with the leading ends of the preselected number of phase insulators retained on the transfer mechanism and with the trailing ends of the preselected number of phase insulators projecting therefrom; spinning the transfer mechanism and the insulators retained thereon, and engaging and deflecting the trailing ends of the spinning insulators into close proximity with the transfer mechanism, and thereby wrapping the trailing ends of the plurality of insulators about the transfer mechanism; ceasing the spinning of the transfer mechanism and the insulators retained thereon in close proximity thereto; holding the trailing ends of the plurality of insulators in close proximity with the transfer mechanism; interfitting the transfer mechanism with the magnetic core along the bore of the core in mutually aligned relationship; and releasing the trailing ends of the insulators from the transfer mechanism and transferring the insulators from the transfer mechanism to the magnetic core.

12. The method of claim 11 further comprising applying a restraining force to the chain while advancing the chain, and continuing to apply the restraining force after insulators have been severed from the chain.

* * * * *